(12) United States Patent
Vaughn et al.

(10) Patent No.: US 12,385,270 B2
(45) Date of Patent: Aug. 12, 2025

(54) CONNECTED POOL AND SPA HEATER SYSTEM

(71) Applicant: Pentair Water Pool & Spa, Inc., Cary, NC (US)

(72) Inventors: David Vaughn, Cary, NC (US); Edward Feten, Cary, NC (US); Zachary Steven Pickard, Carrboro, NC (US); Jacob Moya-Mendez, Denton, NC (US); Michel Durand, Carros (FR); Yves-Marie Le Lay, Carros (FR); Martin De Jerphanion, Carros (FR); Stephane Colomb, St. Blaise (FR)

(73) Assignee: Pentair Water Pool & Spa, Inc., Cary, NC (US)

( * ) Notice: Subject to any disclaimer, the term of this patent is extended or adjusted under 35 U.S.C. 154(b) by 551 days.

(21) Appl. No.: 17/650,611

(22) Filed: Feb. 10, 2022

(65) Prior Publication Data

US 2022/0251861 A1    Aug. 11, 2022

Related U.S. Application Data

(60) Provisional application No. 63/200,024, filed on Feb. 10, 2021.

(51) Int. Cl.
*F24H 15/464* (2022.01)
*E04H 4/12* (2006.01)
(Continued)

(52) U.S. Cl.
CPC ............. *E04H 4/129* (2013.01); *F24H 1/107* (2013.01); *F24H 1/54* (2022.01); *F24H 9/139* (2022.01);
(Continued)

(58) Field of Classification Search
CPC ....... E04H 4/129; F24H 15/464; F24H 9/139; F24H 1/54; F24H 1/107; G05B 15/02; G05D 7/0635
See application file for complete search history.

(56) References Cited

U.S. PATENT DOCUMENTS 4,279,128 A    7/1981  Leniger
5,577,661 A *  11/1996 Puett, Jr. ................. E04H 4/129
                                              237/63

(Continued)

FOREIGN PATENT DOCUMENTS

WO          9609500 A1     3/1996

OTHER PUBLICATIONS

Extended European Search Report issued for European Patent Application No. 22156091.5 dated Jun. 13, 2022, 9 pages.

*Primary Examiner* — Gary Collins
(74) *Attorney, Agent, or Firm* — Husch Blackwell LLP

(57) ABSTRACT

A connected heating system is provided. The system includes a heater having a first inflow port and a first outflow port, a controller that monitors one or more conditions relating to the heater, and a heater bypass coupled between the first inflow port and the first outflow port. The system also includes a valve that controls flow of water received from a pool into the first inflow port and the heater bypass based on operating state identified by the controller. In operation, responsive to the controller identifying the operating state, the controller is configured to transmit control signals that direct actuation of the valve to achieve the operating state. Additionally, the heater is configured to heat portions of the water from the pool that flow between the first inflow port and the first outflow port when a heating mode is active.

20 Claims, 14 Drawing Sheets

(51) Int. Cl.
  *F24H 1/10* (2022.01)
  *F24H 1/54* (2022.01)
  *F24H 9/13* (2022.01)
  *G05B 15/02* (2006.01)
  *G05D 7/06* (2006.01)
(52) U.S. Cl.
  CPC ........... *F24H 15/464* (2022.01); *G05B 15/02* (2013.01); *G05D 7/0635* (2013.01)

(56) References Cited

U.S. PATENT DOCUMENTS

| | | | |
|---|---|---|---|
| 2004/0004034 A1* | 1/2004 | Hornsby | F16K 31/0668 210/167.12 |
| 2009/0039030 A1* | 2/2009 | Revak | C02F 1/02 210/764 |
| 2013/0291948 A1* | 11/2013 | Mc Queen | E04H 4/12 137/334 |
| 2015/0040307 A1 | 2/2015 | Deloche et al. | |
| 2015/0260428 A1* | 9/2015 | Haldeman | F24H 1/142 4/493 |
| 2015/0368921 A1* | 12/2015 | Dzindo | F24H 15/32 62/238.7 |
| 2017/0215261 A1* | 7/2017 | Potucek | G05D 21/02 |

* cited by examiner

CONNECTED POOL AND SPA HEATER SYSTEM

RELATED APPLICATIONS

This application claims priority to U.S. Provisional Application No. 63/200,024 filed on Feb. 10, 2021, and titled "CONNECTED POOL AND SPA HEATER SYSTEM." U.S. Application No. 63/200,024 is hereby fully incorporated by reference as if set forth fully herein.

BACKGROUND

As the cost of microprocessors and other computing components has decreased, there has been expanded use of such components to create network connected controllable systems for pools and/or spas. However, such existing systems have not fully developed the connectivity with respect to the pool and/or spa water heating systems. In particular, there is an ongoing need for improved connected heating systems that report relevant data to associated control systems via a simple easy to connect interface and data format.

Furthermore, there is a need for improved integration between connected heating systems and valves that control flow of water into and out of the heater. For example, in some pool and spa heating systems, a manually controlled valve is used in relation to a heater bypass to control a flow rate of water entering into the heater. Normally, the user needs to manually adjust this valve based on various environmental and/or seasonal factors to ensure efficient operation of the heater. This manual adjustment is particularly important in systems where the heater comprises a heat pump and maintaining a maximum coefficient of performance (COP) for the heat pump can result in significant energy cost savings. However, the effort associated with monitoring and changing the valve manually has led users to disregard the adjustment process, which has led to inefficient use of the heat pumps.

In light of these and other defects there is continuing need for improved pool and spa heater systems.

SUMMARY

Figure 1:
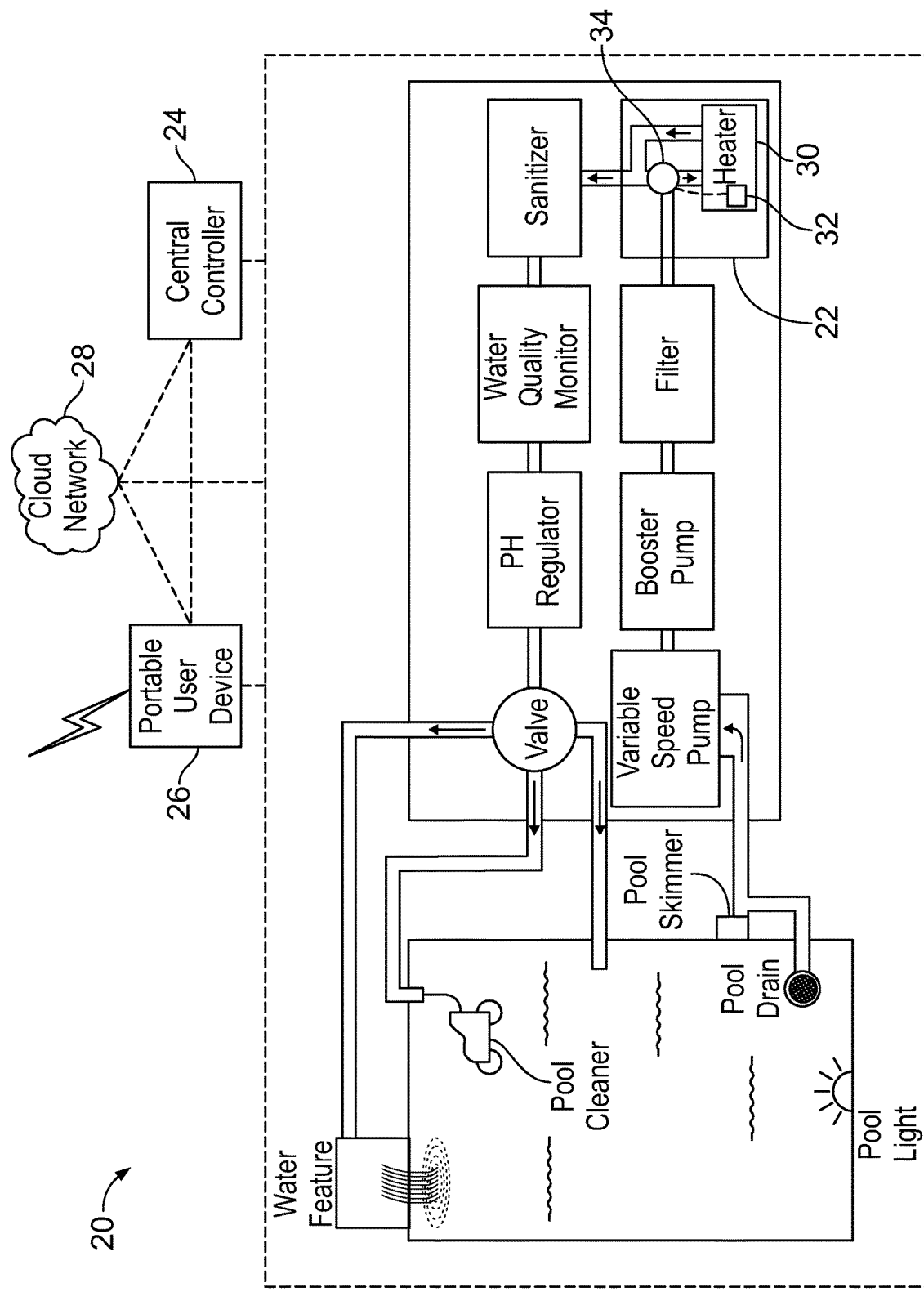
FIG. 1 is a schematic diagram of a connected pool system according to disclosed embodiments.

Embodiments described herein include a connected heating system comprising a heater having a first inflow port and a first outflow port, a controller that monitors one or more conditions relating to the heater, a heater bypass coupled between the first inflow port and the first outflow port, and a valve that controls flow of water received from a pool into the first inflow port and the heater bypass based on operating state identified by the controller. Responsive to the controller identifying the operating state, the controller is configured to transmit control signals that direct actuation of the valve to achieve the operating state. The heater is configured to heat portions of the water from the pool that flow between the first inflow port and the first outflow port when a heating mode is active.

In some embodiments, the heater bypass includes a second inflow port coupled to the first inflow port of the heater and a second outflow port coupled to the first outflow port of the heater. The valve is coupled between the second inflow port and the second outflow port. The operating state includes a timed sequence of actuations of the valve between a closed state and an opened state. In the closed state, the valve blocks flow of the water from the pool between the second inflow port and the second outflow port, and, in the open state, the valve attenuates flow of the water from the pool into the first inflow port by directing the water received from the pool to flow into both and the first inflow port of the heater and the second inflow port of the heater bypass.

In some embodiments, the operating state includes one of a plurality of actuation states of the valve. The plurality of actuation states of the value includes a fully closed state, a fully open state, and one or more intermediate states. In the fully closed state, the valve directs the water received from the pool to flow into the heater bypass by blocking flow into the first inflow port. In the fully open state, the valve enables water to flow freely into the first inflow port by blocking flow into the heater bypass. In the one or more intermediate states, the valve attenuates flow of the water from the pool into the first inflow port by directing the water received from the pool to flow into both the heater bypass and the first inflow port.

In some embodiments, the heater includes a gas heater comprising a heater control board, an ignition control module electrically connected to the heater control board, a burner, and a blower motor. The heater control board is configured to activate the blower motor and direct the ignition control module to ignite the burner to engage the heating mode.

In some embodiments, the heating system further comprises a water temperature sensor electrically coupled to the controller. In these embodiments, the one or more conditions relating to the heater include a temperature of the water flowing between the first inflow port and the first outflow port as relayed to the controller by the temperature sensor. When the controller determines that the temperature of the water is below a first preconfigured threshold, the heater control board engages the heating mode, and the controller identifies the operating state as a fully open state where the valve enables the water from the pool to flow freely into the first inflow port by blocking flow into the heater bypass. When the controller determines that the temperature of the water is above a second preconfigured threshold, the heater control board disengages the heating mode, and the controller identifies the operating state as an intermediate state where the valve attenuates flow of the water from the pool into the first inflow port by directing the water received from the pool to flow into both the heater bypass and the first inflow port.

In some embodiments, the heater control board comprises the controller. In some embodiments, the controller is electrically connected to the heater control board via a wireless medium. In some embodiments, the controller is electrically connected to the heater control board via an RS485 connection that includes a half-duplex 485 link that operates in a listen only mode such that the heater control board is configured to transmit only when sending of data to the controller is required.

In some embodiments, the heater system further comprises an actuator connected to the valve and electrically coupled to the controller. The actuator is configured to actuate the valve into the operating state in response to receiving the control signals from the controller.

In some embodiments, the valve includes a T configuration where one opening of the valve is coupled to the first inflow port by a pipe or conduit that is substantially parallel to the ground and another opening of the valve is coupled to the heater bypass. In these embodiments, the heater bypass is substantially perpendicular to the ground. In some embodiments, a check valve is positioned between the first outflow port and a second outflow port of the heater bypass to prevent heated water from flowing back into the heater.

In some embodiments, the heater includes a heat pump comprising a heater control board, an expansion valve, a compressor, a condenser coupled between the expansion valve and the compressor, an evaporator coupled between the expansion valve and the compressor, a fan that removes cool air from the heater and directs outside air onto the evaporator, and a thermal fluid configured to circulate through the expansion valve, the compressor, the condenser, and the evaporator. The condenser is in contact with the water flowing between the first inflow port and the first outflow port and the heater control board is configured to activate the fan, the expansion valve, and the compressor to circulate the thermal fluid to engage the heating mode. During circulation, the thermal fluid is initially heated by the outside air that collects on the evaporator, is further heated via compression by the compressor, and sheds heat to the water flowing between the first inflow port and the first outflow port at the condenser.

In some embodiments, the connected heating system further comprises a water temperature sensor electrically coupled to the controller and configured to measure and relay to the controller a temperature of the water flowing between the first inflow port and the first outflow port. When the controller determines that the temperature of the water is below a first preconfigured threshold, the heater control board engages the heating mode, and, when the controller determines that the temperature of the water is above a second preconfigured threshold, the heater control board disengages the heating mode.

In some embodiments, the controller parses the one or more conditions relating to the heater to determine a current coefficient of performance (COP) of the heat pump, and wherein, when the current COP is less than a maximum COP, the controller identifies the operating state for the valve as one where the valve controls the flow of the water received from the pool into the first inflow port and the heater bypass to change the current COP to the maximum COP.

In some embodiments, the connected heating system further comprises a housing that contains the heater control board, the expansion valve, the compressor, the condenser the evaporator, the fan, the valve, and the heater bypass. The heater bypass includes a second inflow port coupled to the first inflow port of the heater and a second outflow port coupled to the first outflow port of the heater and the valve is coupled between the second inflow port and the second outflow port. The operating state includes a timed sequence of actuations of the valve between a closed state and an opened state. In the closed state, the valve blocks flow of the water from the pool between the second inflow port and the second outflow port. In the open state, the valve attenuates flow of the water from the pool into the first inflow port by directing the water received from the pool to flow into both and the first inflow port of the heater and the second inflow port of the heater bypass. The controller identifying the operating state so as adjust the current COP to the maximum COP includes the controller identifying a new timed sequence of actuations of the valve between the closed state and the opened state.

In some embodiments, the one or more conditions include at least one or more of a respective temperature of the water at the first inflow port and the first outflow port, a condensing temperature, and pressure at an outlet of the compressor.

In some embodiments the connected heating system further comprises a plurality of sensors that each correspond to one or more of the one or more conditions monitored by the controller, wherein the plurality of sensor include at least one of a temperature sensor, a pressure sensor, and/or a flow rate monitor.

In some embodiments, the controller is electrically connected to the heater control board via at least one of a wired medium and wireless medium.

Embodiments described herein also include a connected heating system comprising a heater having a housing, a first inflow port in fluid communication with the housing, a first outflow port, a heater control board disposed inside the housing, an ignition control module electrically connected to the heater control board and disposed inside the housing, a burner disposed inside the housing, and a blower motor disposed inside the housing. The connected heating system also comprises a controller that monitors a temperature of water flowing between the inflow port and the outflow port of the heater, a heater bypass coupled between the first inflow port and the first outflow port, and a valve that controls flow of water received from a pool into the first inflow port and the heater bypass based on operating state identified by the controller. Responsive to the controller identifying the operating state, the controller is configured to transmit control signals that direct actuation of the valve to achieve the operating state. The heater is configured to engage a heating mode to heat portions of the water from the pool that flow between the first inflow port and the first outflow port by activating the blower motor and directing the ignition control module to ignite the burner.

In some embodiments, the operating state includes one of a plurality of actuation states of the valve, the plurality of actuation states of the value including a fully closed state, a fully open state, and one or more intermediate states, wherein, in the fully closed state, the valve directs the water received from the pool to flow into the heater bypass by blocking flow into the first inflow port, wherein, in the fully open state, the valve enables water to flow freely into the first inflow port by blocking flow into the heater bypass, and wherein, in the one or more intermediate states, the valve attenuates flow of the water from the pool into the first inflow port by directing the water received from the pool to flow into both the heater bypass and the first inflow port.

In some embodiments, the connected heating system further comprises a water temperature sensor electrically coupled to the controller. The water temperature sensor measures and relays to the controller the temperature of the water flowing between the inflow port and the outflow. When the controller determines that the temperature of the water is below a first preconfigured threshold, the heater control board engages the heating mode, and the controller identifies the operating state as a fully open state where the valve enables the water from the pool to flow freely into the first inflow port by blocking flow into the heater bypass. When the controller determines that the temperature of the water is above a second preconfigured threshold, the heater control board disengages the heating mode, and the controller identifies the operating state as an intermediate state where the valve attenuates flow of the water from the pool into the first inflow port by directing the water received from the pool to flow into both the heater bypass and the first inflow port.

Embodiments described herein are also directed to a method comprising monitoring a temperature of water flowing between an inflow port and an outflow port of the heater via a controller and a sensor in communication with the controller, engaging a heating mode of the heater to heat the water flowing between the inflow port and the outflow port via a heater control board of the heater when the controller determines that the temperature of the water is below a first preconfigured temperature threshold, sending a first control signal to actuate a valve into a fully open state where the valve enables the water to flow freely into the first inflow port by blocking flow into a heater bypass when the heating mode is engaged, disengaging the heating mode of the heater when the controller determines that the temperature of the water is above a second preconfigured temperature threshold, and sending a second control signal to actuate the valve into an intermediate state where the valve attenuates flow of the water into the inflow port by directing the water to flow into both the heater bypass and the first inflow port when the heating mode is disengaged. In some embodiments of the method, the first preconfigured temperature is the same as the second preconfigured temperature. In some embodiments of the method the controller is electrically connected to the heater control board via an RS485 connection that includes a half-duplex 485 link that operates in a listen only mode such that the heater control board is configured to transmit only when sending of data to the controller is required.

Embodiments described herein are also directed to a method comprising monitoring one or more conditions relating to a heat pump via a controller, parsing, via the controller, the one or more conditions relating to the heat pump to determine a current coefficient of performance (COP) of the heat pump, identifying, with the controller, an operating state for a valve that adjusts the current COP to the maximum COP when the current COP is less than a maximum COP, transmitting control signals that direct actuation of the valve to achieve the operating state from the controller to an actuator for the valve, actuating the valve into the operating state via the actuator in response to receiving the actuator the control signals from the controller, and controlling flow of water received from a pool into a first inflow port of the heat pump and a second inflow port of heater bypass with the valve to adjust the current COP to the maximum COP when the valve is actuated into the operating state.

In some embodiments of the method, the operating state includes a timed sequence of actuations of the valve between a closed state and an opened state. In the closed state, the valve blocks flow of the water from the pool between the second inflow port of the heater bypass and a second outflow port of the heater bypass. In the open state, the valve attenuates flow of the water from the pool into the first inflow port by directing the water received from the pool to flow into both and the first inflow port of the heater and the second inflow port of the heater bypass. The controller identifying the operating state so as adjust the current COP to the maximum COP includes the controller identifying a new timed sequence of actuations of the valve between the closed state and the opened state.

In some embodiments of the method, the one or more conditions include at least one or more of a respective temperature of the water at the first inflow port of the heat pump and a first outflow port of the heat pump, a condensing temperature, and/or a pressure at an outlet of a compressor of the heat pump.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an exemplary connected aquatic application, such as a pool or spa system 20, according to disclosed embodiments. As seen in FIG. 1, the connected pool or spa system 20 can include a heating system 22 configured to heat water for the pool and/or a spa to a set temperature. One or more additional components may be optionally included in the pool or spa system 20, including, for example, a filter, a booster pump, a variable speed pump, one or more sensors and/or valves, a pH and/or water chemistry regulation mechanism, a water quality monitor, a sanitizer, and various communication enabling devices, described in more detail below. One or more of the components are provided in communication with each other and the pool to form a fluid circuit. The fluid circuit facilitates water movement from the pool or spa through one or more of the pool components and the fluid circuit to accomplish various tasks including, for example, pumping, cleaning, heating, sanitizing, and the like. Additional arrangements of the one or more additional components besides those shown in FIG. 1 that are known in the art are also contemplated.

Still referring to FIG. 1, the pool or spa system 20 further includes a central controller 24, and a portable user device 26 that can interface with the central controller 24, either directly over a local area network, or via a cloud network 28. Although FIG. 1 depicts the central controller 24, the portable user device 26, and the cloud network 28, it should be noted that various communication methodologies and connections may be implemented to work in conjunction with, or independent from, one or more local controllers associated with each individual components associated with the pool or spa system 20 (e.g., controller of the pump, controller of the heater, etc.).

Figure 2:
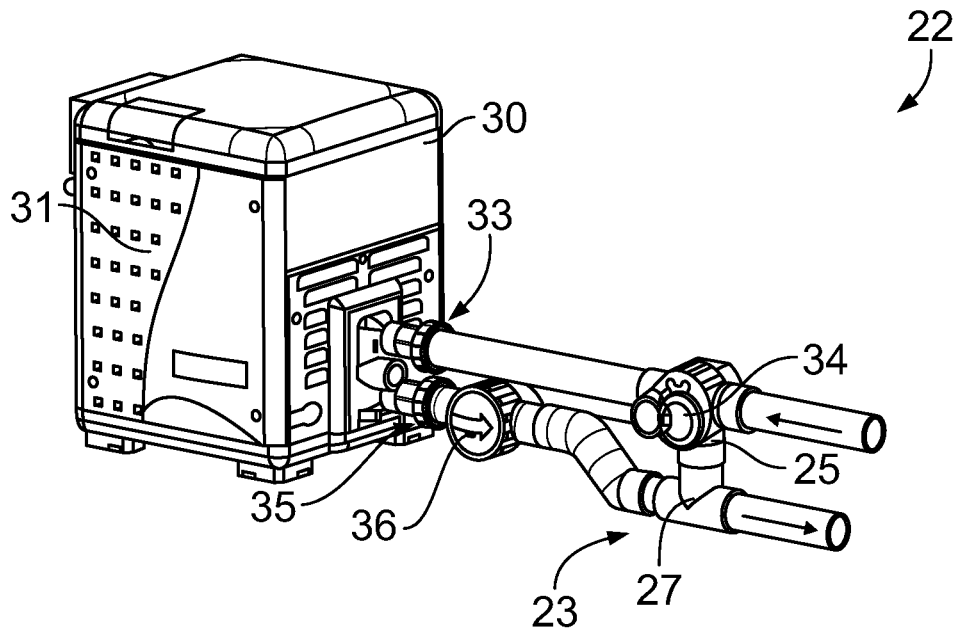
FIG. 2 is an isometric view of a connected heater system according to disclosed embodiments that may be used in the pool system depicted in FIG. 1.

As best seen in FIGS. 1 and 2, the heating system 22 is provided in the form of a heater 30, a heater control board 32, and a valve 34 that is configured to control flow of water into and out of the heater 30.

The heater 30 includes a housing 31 in fluid communication with a first inflow port 33 and a first outflow port 35 designed to accommodate incoming and outgoing water, respectively, through the heater 30. Plumbing is provided to facilitate fluid communication between the various components of the heating system 22. The heater bypass 23 can be coupled between the first inflow port 33 and the first outflow port 35 and can include a second inflow port 25 and a second outflow port 27. In some embodiments, the heating system 22 can include a check valve 36 provided in the plumbing of the first outflow port 35 of the heater 30 that is designed to prevent heated water from flowing back into the heater 30.

In operation, a controller such as the heater control board 32, the central controller 24, and/or the portable user device 26, can monitor one or more conditions relating to the heater 30. The valve 34 can be configured to control flow of water received from a pool into the first inflow port 33 and the heater bypass 23 based on operating state identified by the controller, and the heater 30 can be configured to heat portions of the water from the pool that flow between the first inflow port 33 and the first outflow port 35 when a heating mode is active. Furthermore, in response to identifying the operating state, the controller can be configured to transmit control signals that direct actuation of the valve 34 to achieve the operating state. In some embodiments, the controller can be electrically coupled to a plurality of sensors 39 that relay the one or more conditions relating to the heater 30 to the controller.

Figure 3:
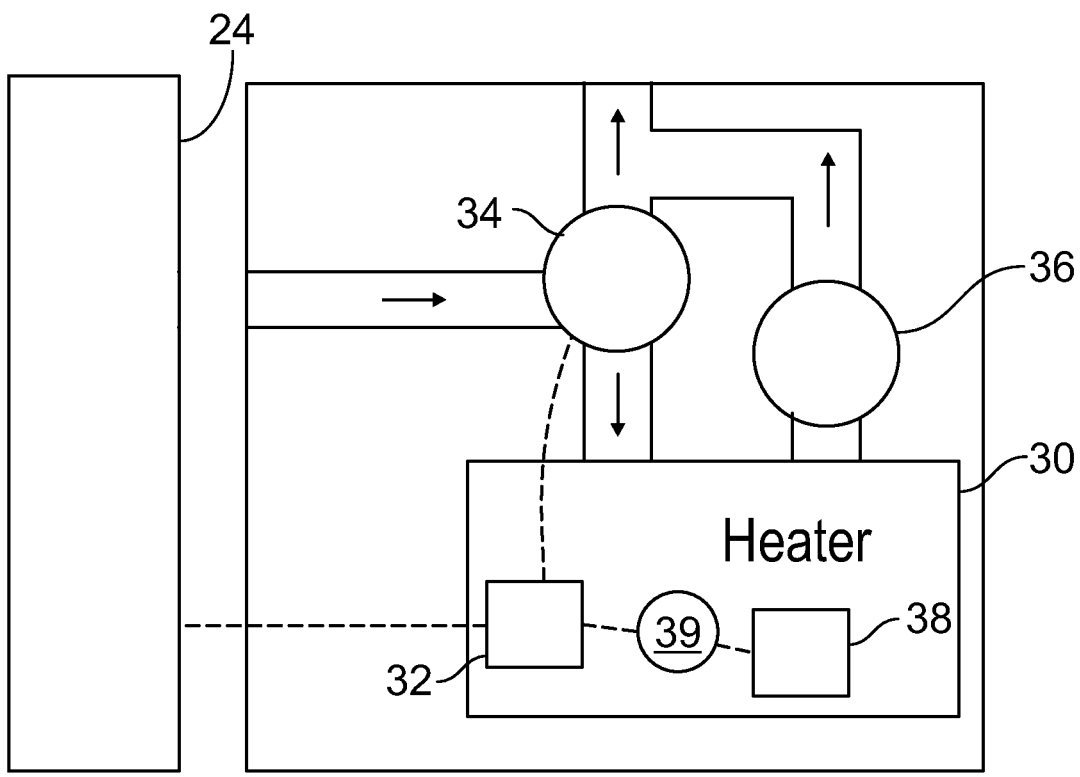
FIG. 3 is a schematic drawing of the connected heater system of FIG. 2 according to disclosed embodiments.

Referring to FIG. 2 and FIG. 3, in some embodiments, the valve 34, can be provided as a three way valve with various open and closed positions, as described hereinbelow. The valve 34 can be coupled to the first inflow port 33 of the heater 30 and, in embodiments where the controller comprises the heater control board 32, can be electrically connected to the heater control board 32 to receive control commands therefrom to change a position of the valve 34. In some embodiments, the valve 34 may be the Intellivalve™ provided by Pentair Water Pool & Spa (Cary, NC). Furthermore, as seen in FIG. 2, in some embodiments, the valve 34 can be placed outside of the housing 31 and have a T configuration where one opening of the valve 34 is coupled to the first inflow port 33 by a pipe or conduit that is substantially parallel to the ground, and another opening of the valve 34 is coupled to the heater bypass 23 that is substantially perpendicular to the ground. Further still, as seen in FIG. 2 the check valve 36 can be positioned between the first outflow port 35 and the second outflow port 27. In some embodiments, another pipe or conduit between an exit port of the check valve 36 and the second outflow port 27 can have an s-shape configuration where one end is higher of the ground than another end. It should be noted that other additional positions and configurations for the pipes or conduits as known in the art are also contemplated.

In some embodiments, the operating state for the valve 34 can include one of a plurality of actuation states of the valve 34. These plurality of actuation states can include a fully closed state, a fully open state, and one or more intermediate states. In the fully closed state, the valve 34 directs the water received from the pool to flow into the heater bypass 23 by blocking flow into the first inflow port 33. In the fully open state, the valve 34 enables water to flow freely into the first inflow port 33 by blocking flow into the heater bypass 23. In the one or more intermediate states, the valve 34 can attenuate flow of the water from the pool into the first inflow port 33 by directing the water received from the pool to flow into both the heater bypass 23 and the first inflow port 33.

Figure 4:
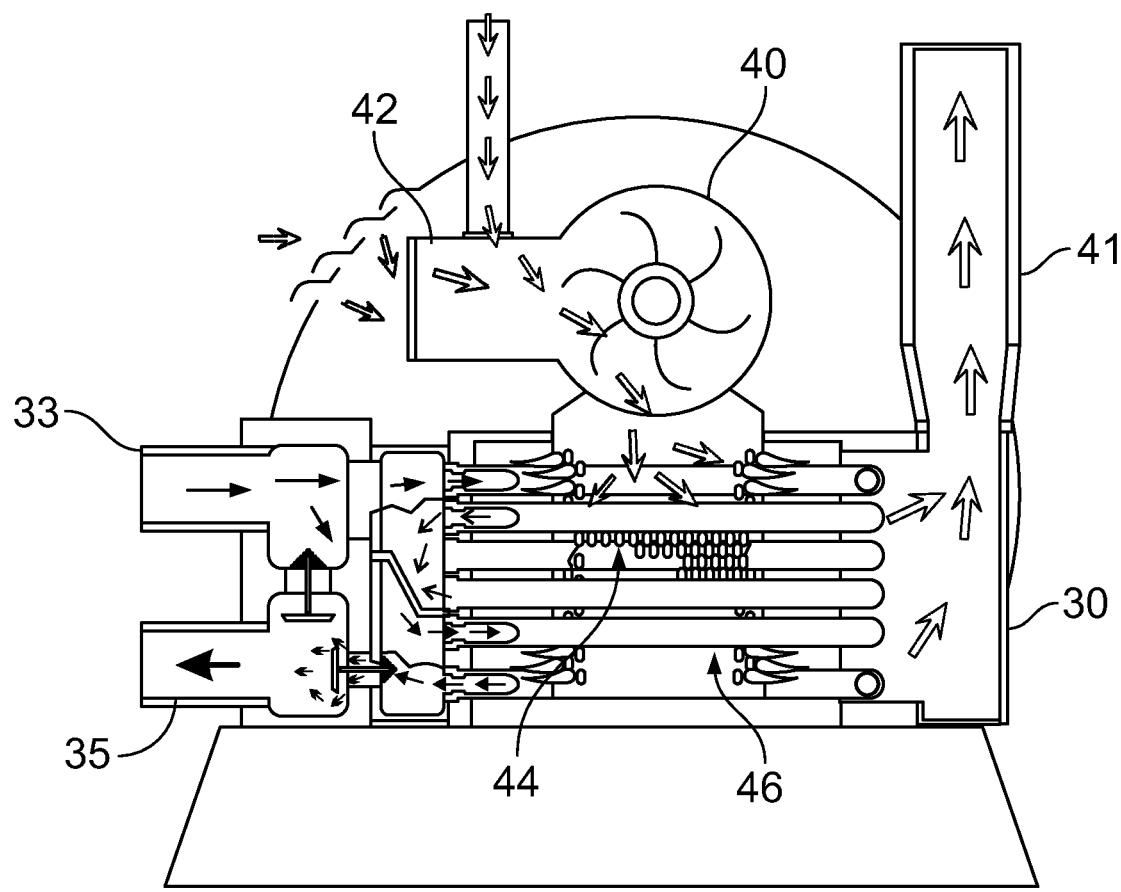
FIG. 4 is a schematic cross-sectional view of various internal components of a heater of a connected heater system of FIGS. 2 and 3 according to disclosed embodiments.

As shown in FIG. 4, in some embodiments the heater 30 can include a gas heater that further includes an ignition control board or module 38, a blower motor 40, an exhaust 41, an air/fuel mixing chamber 42, a burner 44, heating coils 46 through which the water fed into the heater 30 flows, and one or more other components associated with a gas heater. The ignition control module 38 is coupled to and controlled by the heater control board 32. For example, the heater control board 32 is configured to activate the blower motor 40 and direct the ignition control module 38 to ignite the burner 44 to engage the heating mode.

Figure 5:
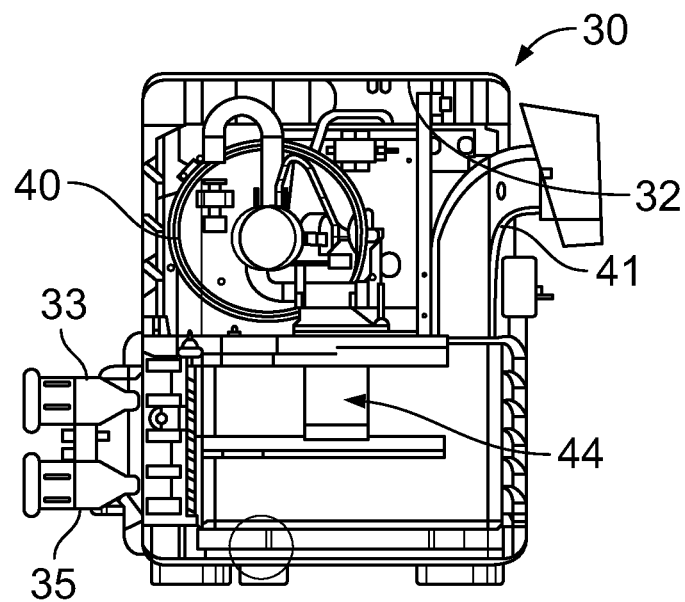
FIG. 5 is a schematic cross-sectional view of various internal components of the heater of the connected heater system of FIGS. 2 and 3 according to disclosed embodiments.
Figure 6A:
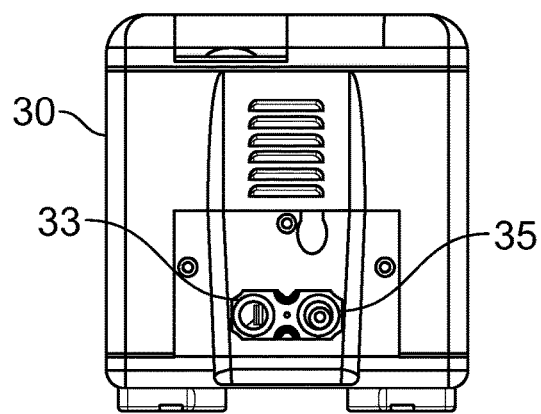
FIG. 6A is a front view of a heater of a connected heater system according to disclosed embodiments.
Figure 6B:
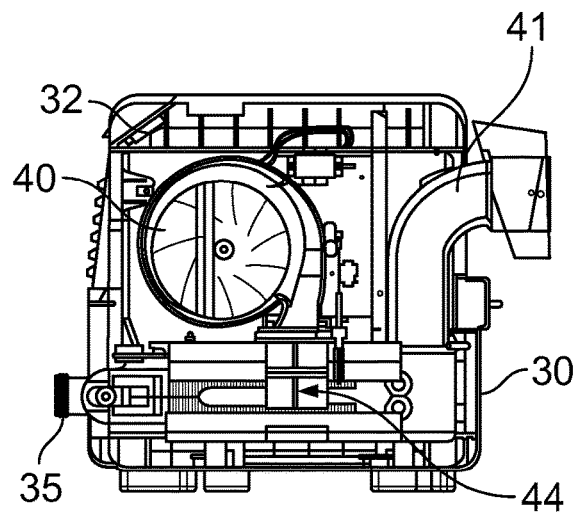
FIG. 6B is a cross-sectional view of a heater of a connected heater system according to disclosed embodiments.
Figure 7A:
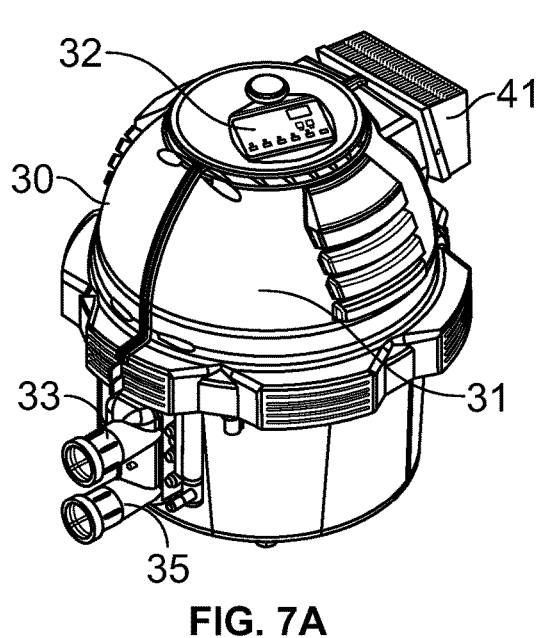
FIG. 7A is a front view of a heater of a connected heater system according to disclosed embodiments.
Figure 7B:
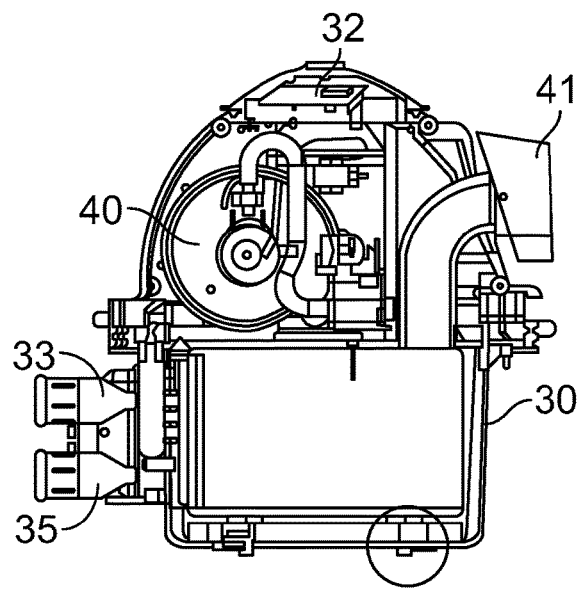
FIG. 7B is a cross-sectional view of a heater of a connected heater system according to disclosed embodiments.

Furthermore, as seen in FIGS. 5-7B, various embodiments for the size and shape of the heater 30 are contemplated so as to accommodate different water heating requirements as would be understood by those having ordinary skill in the art. For example, as seen in FIG. 5, the heater 30 can have a large internal volume section for accommodating a larger volume of water flow. However, as seen in FIG. 6A and FIG. 6B, a compact lower internal volume heater is also contemplated. Further still, as seen in FIGS. 7A and 7B, a version of the heater 30 where the housing 31 has a rounded profile is contemplated. Furthermore, as seen in FIGS. 5-7B various orientations for the first inflow port 33 and the first outflow port 35 are contemplated. For example, as seen in FIGS. 5, 7A, and 7B, the first inflow port 33 and the first outflow port 35 can be arranged in a vertical configuration with the first inflow port 33 on top of the first outflow port 35. Additionally or alternatively, as seen in FIGS. 6A and 6B, the first inflow port 33 and the first outflow port 35 can be arranged in a horizontal configuration where the first inflow port 33 is on a left side of the housing 31 and the first outflow port is on a right side of the housing 31. Additional and alternative arrangements known in the art are also contemplated including arrangements where the positions of the first inflow port 33 and the first outflow port 35 are swapped.

In some embodiments, the controller, including but not limited to the heater control board 32, can engage the heating mode and control actuation of the valve 34 based on a temperature of the water flowing between the first inflow port 33 and the first outflow port 35. In these embodiments, one of the plurality of sensors 39 can include a water temperature sensor (e.g. a thermistor) and the one or more conditions relating to the heater 30 can include the temperature of the water flowing between the first inflow port 33 and the first outflow port 35 as relayed to the controller by the temperature sensor. In these embodiments, when the controller determines that the temperature of the water is below a first preconfigured threshold, the heater control board 32 can engage the heating mode and the controller can identify the operating state for the valve 34 as a fully open state where the valve 34 enables the water from the pool to flow freely into the first inflow port 33 by blocking flow into the heater bypass 23. Furthermore, when the controller determines that the temperature of the water is above a second preconfigured threshold the heater control board 32 can disengage the heating mode and the controller can identify the operating state as an intermediate state where the valve 34 attenuates flow of the water from the pool into the first inflow by directing the water received from the pool to flow into both the heater bypass 23 and the first inflow port 33. In some embodiments, the first preconfigured threshold can be the same as the second preconfigured threshold. However, in some embodiments the first preconfigured threshold can be lower than the second preconfigured threshold.

The heater control board 32 is also designed to undertake various other control operations of the heater 30. For example, a user may manually turn the heater 30 on by pushing a button (not shown) on the heater 30, or via an interface provided on the portable user device 26. Alternatively, a user may enter the first or second preconfigured thresholds or other desired water temperature setpoints, or water temperature setpoint ranges (e.g., upper and lower limit) in which the heater 30 should maintain the water temperature at. In other embodiments, the user may set a schedule in which the heater 30 should operate.

In one example of the operation process described herein, the heater control board 32 may use inputs from one or more of the plurality of sensors 39, internally stored settings, and/or control signals received from other devices (e.g., local on-board controllers, the central controller 24, and/or the portable user device 26) to commence various operations. Based on the inputs, the heater control board 32 is designed to direct (1) the ignition control module 38 to activate the blower motor 40 so as to begin mixing air and fuel together in the mixing chamber 42, and feed the mix of air and fuel to the burner 44, (2) the ignition control module 38 to ignite the burner 44 to combust the mix of air and fuel so that water flowing through the heating coils 46 is heated to the desired temperature, and (3) control operation of the valve 34 to one of the plurality of actuation states where approximately 100% of the water flowing into the valve 34 flows into the heater 30 and through the heating coils 46. In some embodiments, during a normal heating operation, the one of the plurality of operating states for the valve 34 may be an opened state where a small amount of water (e.g., less than 5%) is bypassed around the heater 30 through the heater bypass 23.

In some embodiments, once the heater control board 32 determines that the water has been sufficiently heated and has reached a pre-determined temperature setpoint, the heater control board 32 is designed to direct (1) the ignition control module 38 to deactivate the burner 44 and the blower motor 40, and (2) the valve 34 to transition to a second one of the plurality of operating states where the valve 34 is operated between about 90% to about 95% to allow less than 100% of the water flowing into the valve 34 to flow into the heater 30. In some embodiments, when in the second one of the plurality of operating, the valve 34 can allow between about 5% to about 10% of the water flowing into the valve 34 to flow into the heater 30.

Allowing water to flow into the heater 30 when the heater 30 is not actively heating permits measurement of the temperature of the water irrespective of the state of the valve 34. Further, directing a small water flow through the heater 30 during this operation also can reduce the resistance in the system and decrease an amount of wear and tear on a heat exchanger of the heater 30. For example, in some embodiments, when the heater 30 is bypassed, an internal heat exchanger can be exposed to a lower flow rate and a reduced overall volume of water having certain corrosive properties. This can extend the service life of the heat exchanger because the heater 30 can be subjected to a less-corrosive environment during the periods in which the heat exchanger is being bypassed. The bypass operation can also include other benefits. For example, in some embodiments, when the heater 30 is being bypassed, a speed of a variable flow pump's motor that pumps water to the heater 30 can be reduced because a total dynamic head of the system will be lower than it is when the heater is not being bypassed. This speed reduction can reduce the electrical usage of the variable speed pump and result in energy bill cost savings for the user.

In some embodiments, the percentages that the valve 34 is opened or closed in the various ones of the plurality of operating states can be set by a user either locally on the heater 30 or via the portable user device 26 through the central controller 24. For example, in some embodiments, the portable user device 26 can receive user input setting the open/close percentages which the central controller 24 can relay to the heater control board 32 for storage in a local memory thereof.

FIGS. 8A-D are partial views of a connection diagram for the heating system 22 according to disclosed embodiments. In some embodiments, the heater control board 32 can be coupled to various sensors and switches 48 that monitor for and/or activate at the presence of different potential error or fault conditions for the heater 30 and can include a data connection 50 for coupling the heater control board 32 to the valve 34. In some embodiments, the heater control board 32 can be connected to the central controller 24 using an RS485 connection 49 and can communicate control signals, outputs from the various sensors and switches 48, and other relevant data using a customized protocol.

Furthermore, in some embodiments, the RS485 connection 49 can include a half-duplex 485 link that operates in a listen only mode. In some embodiments, the listen only mode can include the heater control board 32 being configured to transmit only when sending of data to the central controller 24 is required. In some embodiments, the heater control board 32 can be configured only to transmit in response to a command from the central controller 24. In some embodiments, the heater control board 32 can ensure data integrity prior to use of the data, by using one or more of a proper address, a proper opcode, a proper packet length, and a proper checksum when compiling and transmitting data to the central controller 24.

In some embodiments, the central controller 24 can be configured as the system master and also operate in a listen only mode (e.g. transmitting only when required). In these embodiments, the central controller 24 can send continuous 'heartbeat' or 'keep alive' packets to the heater control board 32 at a preconfigured rate, such as, for example, approximately every 2 seconds. The continuous 'heartbeat' or 'keep alive' packets can be sent as an undependable transmission where no response from the heater control board 32 is expected or required. In some embodiments, the heater control board 32 can be configured to revert to a standalone or default operation when the continuous 'heartbeat' or 'keep alive' packets fail to be received for more than a preconfigured amount of time (e.g. 60 seconds). In some embodiments, the continuous 'heartbeat' or 'keep alive' packets can be assigned a global destination address when sent to enable the continuous 'heartbeat' or 'keep alive' packets to be received by the heater control board 32 and any other heater control boards in the connected pool or spa system 20.

In some embodiments, the RS485 connection 52 can include color coded 4 wire terminals. For example, in some embodiments, the 4 wire terminals can be color coded with black indicating a DC/Signal Ground, green indicating RS485 'B'/'-Data', Yellow indicating RS485 'A'/'+Data', and Red indicating +15 VDC.

In some embodiments, a command packet from the central controller 24 to the heater control board 32 can include a first preconfigured value associated with the central controller 24 as the source address, a second preconfigured value associated with the heater control board 32 as the destination address, and various control commands for the heater control board 32 in the info field. In some embodiments, the second preconfigured value can be set via user input on a front panel of the heater 30 and/or remotely via the portable user device 26. In some embodiments, the various control commands can include one or more of (1) a System On/Off byte configured to switch the heater 30 between a first mode where the heater is deactivated, a second mode where the heater 30 is activated to heat a pool, and/or a third mode where the heater 30 is activated to heat a spa, (2) a Pool Water Heat Set Point byte that sets a specific water temperature (e.g. between 42-104° F.) for heating in the second mode, (3) a Spa Water Heat Set Point byte that sets a specific water temperature (e.g. between 42-104° F.) for heating in the third mode, and (4) a service mode byte that can switch operation of the heater controller board 32 between remote control, local control, or standalone mode.

In some embodiments, a response packet from the heater control board 32 to the central controller 24 can include the second preconfigured value as the source address, the first preconfigured value as the destination address, and operation data about the heater control board 32 in the info field. In some embodiments, the operation data can include one or more of (1) a heater model ID byte that identifies a model number of the heater 30, (2) a heater mode byte that identifies whether the heater is in the first, second, or third mode, (3) a heating status byte that identifies whether the burner 44 is currently firing or not, and (4) an error mode byte that can include error information pertaining to the potential error or fault conditions for the heater 30 sent as error codes using 8 individual bit flags. In some embodiments, a value of 0 can be used to indicate NO ERROR. In some embodiments, spare bytes of the packet can be assigned to additional error codes when more than 8 error codes are needed.

As seen in FIGS. 8A-D, in some embodiments, the various sensors can include one or more of an automatic fuel shutoff switch that stops fuel from flowing into the mixing chamber 42 when a temperature of the water leaving the heater 30 is above a preconfigured threshold (e.g. greater than 140° F.), a high limit switch that activates when a temperature of the water entering the heater 30 is above a preconfigured threshold (e.g. greater than 135° F.), a pressure switch that activates when there is no flow into the heater 30, an air flow switch that activates when there is not a differential pressure across an air orifice to indicate that the blower motor 40 is not operating correctly, a thermistor that monitors a temperature of the water flowing in the heater 30, and a stack flue sensor (SFS) that monitors a temperature of exhaust gas from the heater 30. In some embodiments, the error codes for the customized protocol can represent different outputs from the various sensors and switches 48. For example, in some embodiments the error codes can include (1) an indication that automatic fuel shutoff switch has activated, (2) an indication that the high limit switch has activated, (3) an indication that the pressure switch has activated, (4) an indication that the air flow switch has activated, (4) a thermistor open signal that indicates that thermistor or wiring thereof may be open circuited, (5) a thermistor short signal that indicates that thermistor or wiring thereof may be short circuited, (6) an indication that a value of the SFS has exceeded a preconfigured temperature value (e.g. 450° F.), (7) an SFS open signal that indicates that SFS or wiring thereof may be open circuited, (8) an SFS short signal that indicates that SFS or wiring thereof may be short circuited, and (9) and RS485 Connection Loss indicator.

Figure 8A:
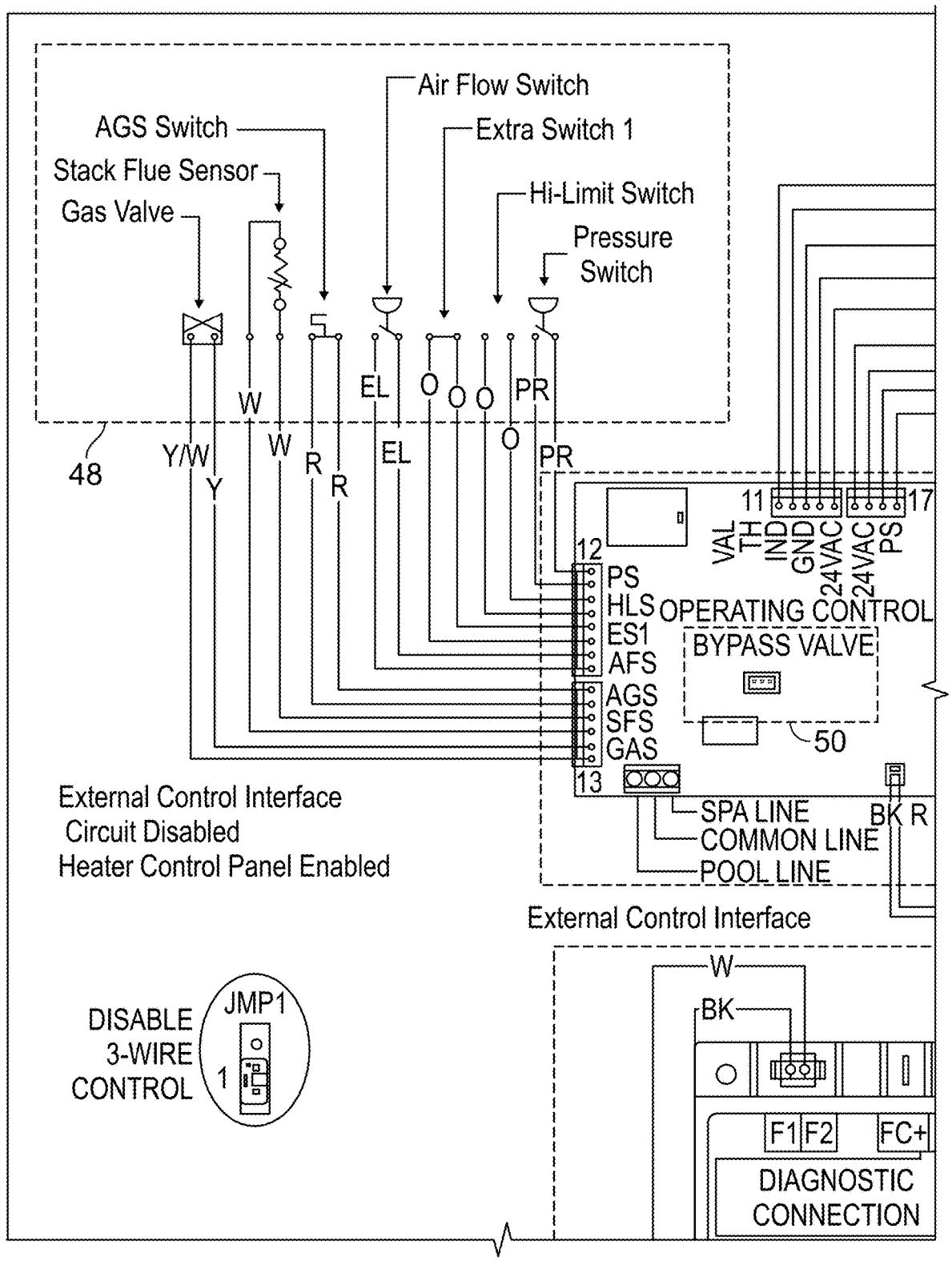
FIG. 8A is a first partial view of a connection diagram of a connected heater system according to disclosed embodiments.
Figure 8B:
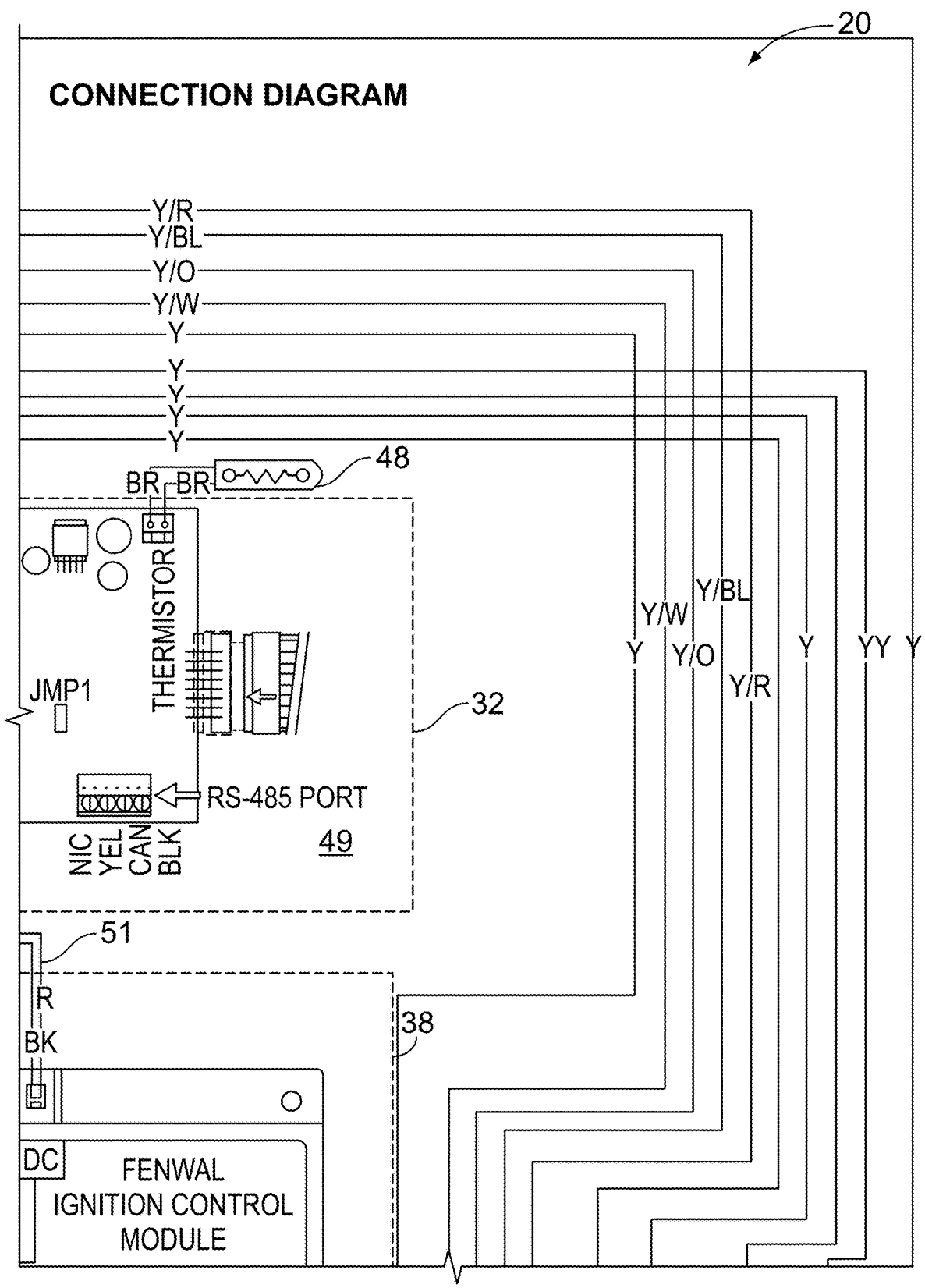
FIG. 8B is a second partial view of a connection diagram of a connected heater system according to disclosed embodiments.
Figure 8C:
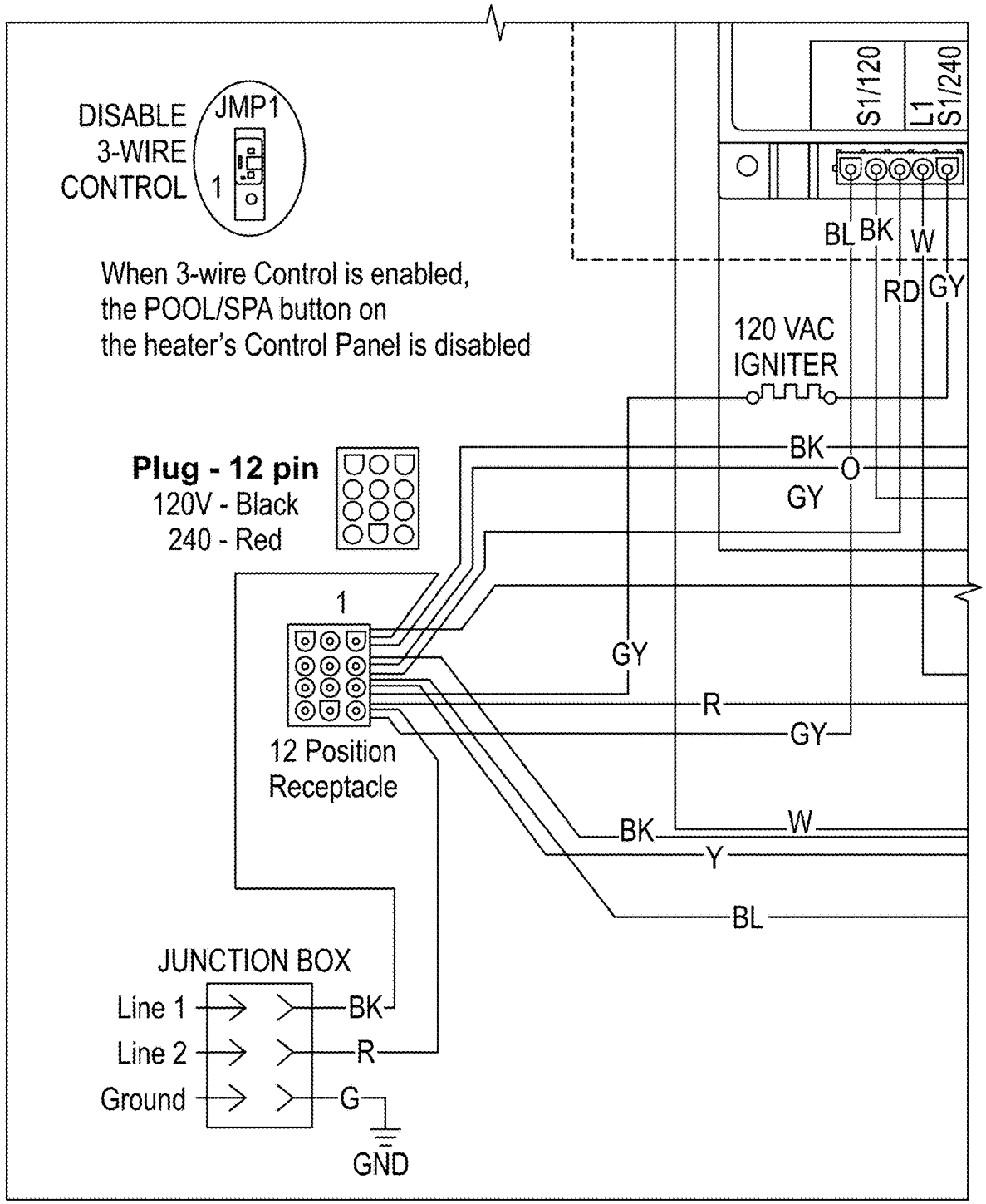
FIG. 8C is a third partial view of a connection diagram of a connected heater system according to disclosed embodiments.
Figure 8D:
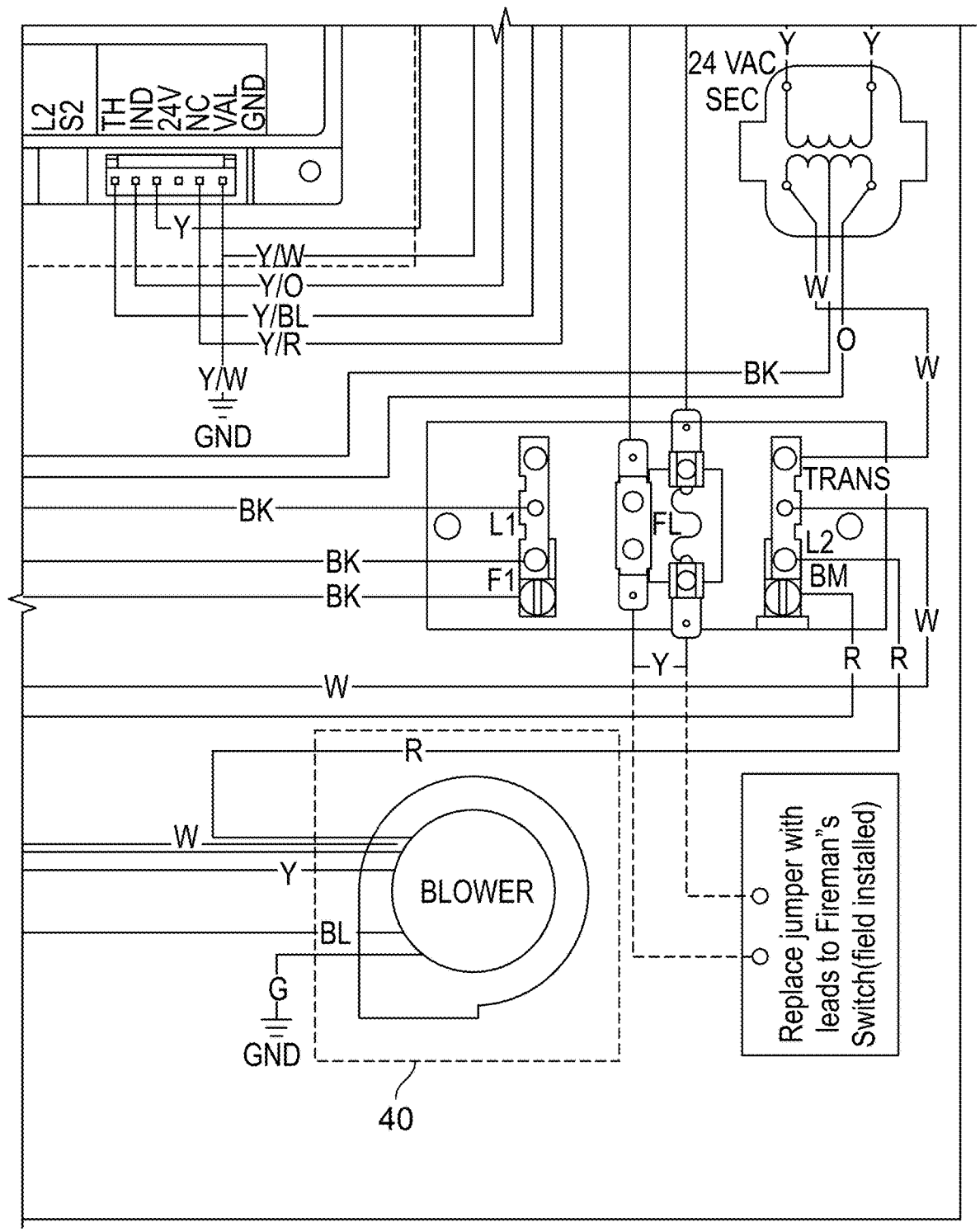
FIG. 8D is a fourth partial view of a connection diagram of a connected heater system according to disclosed embodiments.

In some embodiments, the ignition control module 38 can include a flame sense mechanism that outputs a voltage across two pins that can be between 0 and 1 VDC. In these embodiments, the closer the value is to 1 VDC, the stronger the flame. As seen in FIG. 8B, the heater control board 32 can include a connection 51 to the flame sense output pins of the ignition control module 38. The connection 51 can include a relay that connects the two pins to the microcontroller for reading and processing. In some embodiments, the heater control board 32 can, via the RS485 connection 49 to the central controller 24, provide feedback to the user on whether or not the flame sense value is within an acceptable range or an unacceptable range indicative of a possible fuel or air supply issue. After reading, the voltage the relay can be turned off so as to disconnect the pins for a preset amount of time between readings.

Figure 9:
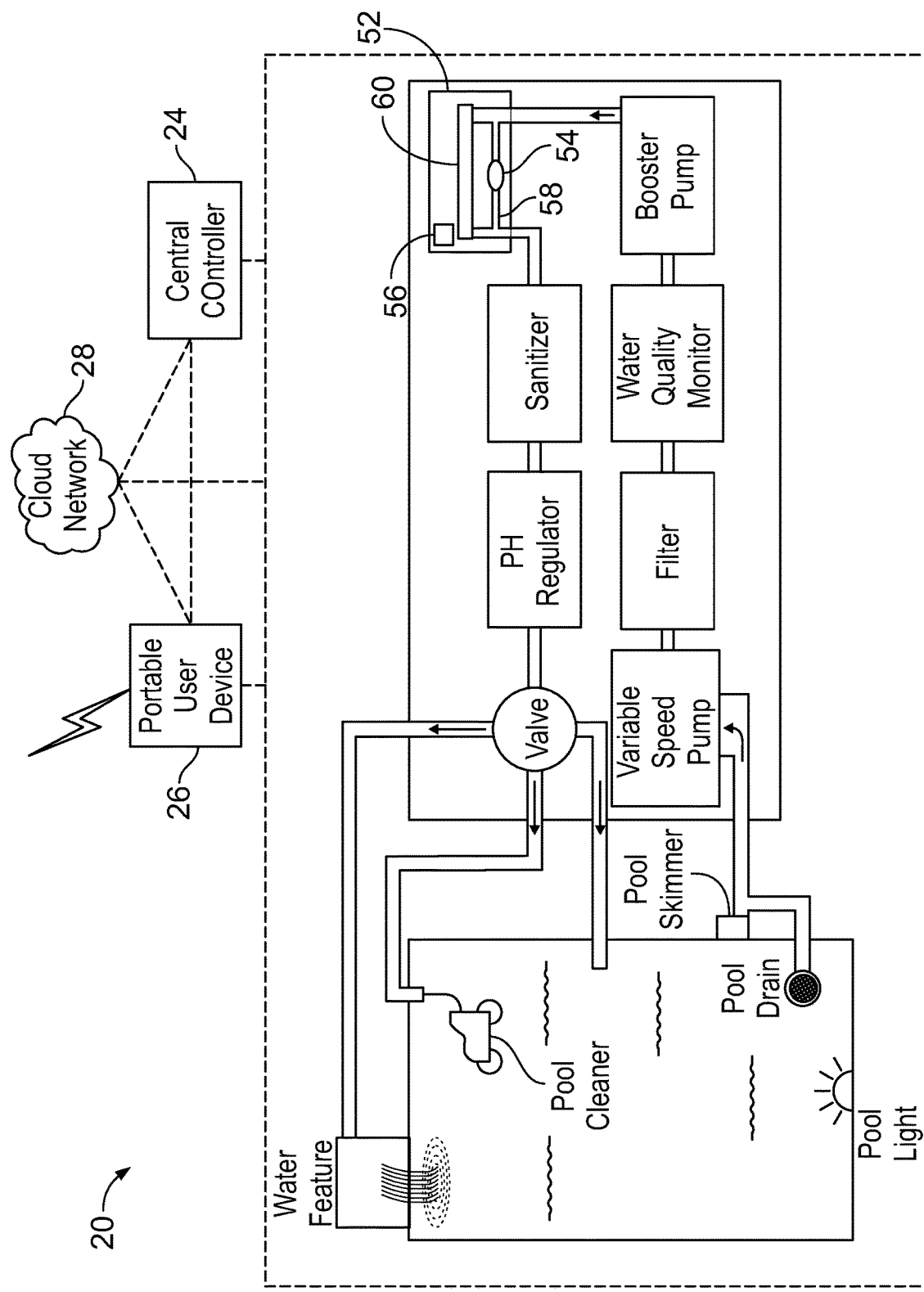
FIG. 9 is a schematic diagram of a connected pool system according to disclosed embodiments.

FIG. 9 illustrates another exemplary embodiment of the pool or spa system 20, according to disclosed embodiments. As seen in FIG. 9, the connected pool or spa system 20 can include a heater 52 in place of the heating system 22 that is also configured to heat water for the pool and/or a spa to a set temperature. Furthermore, as seen in FIG. 9 the one or more additional components in the pool or spa system 20, including, for example, the filter, the booster pump, the variable speed pump, the one or more sensors and/or valves, the pH and/or water chemistry regulation mechanism, the water quality monitor, the sanitizer, and the various communication enabling devices, described in more detail below can be arranged in a different configuration from that of FIG. 1. In particular, as seen in FIG. 9 the booster pump is positioned after the filter and the water quality monitor is positioned after the filter, before the heater 52, and before the booster pump. However, further arrangements of the one or more additional components in the pool or spa system 20 as would be known to those of ordinary skill in the art are also contemplated. As described above in connecting with FIG. 1 the one or more of the components are provided in communication with each other and the pool to form a fluid circuit and/or filtration system. The fluid circuit facilitates water movement from the pool or spa through one or more of the pool components and the fluid circuit to accomplish various tasks including, for example, pumping, cleaning, heating, sanitizing, and the like.

Figure 10:
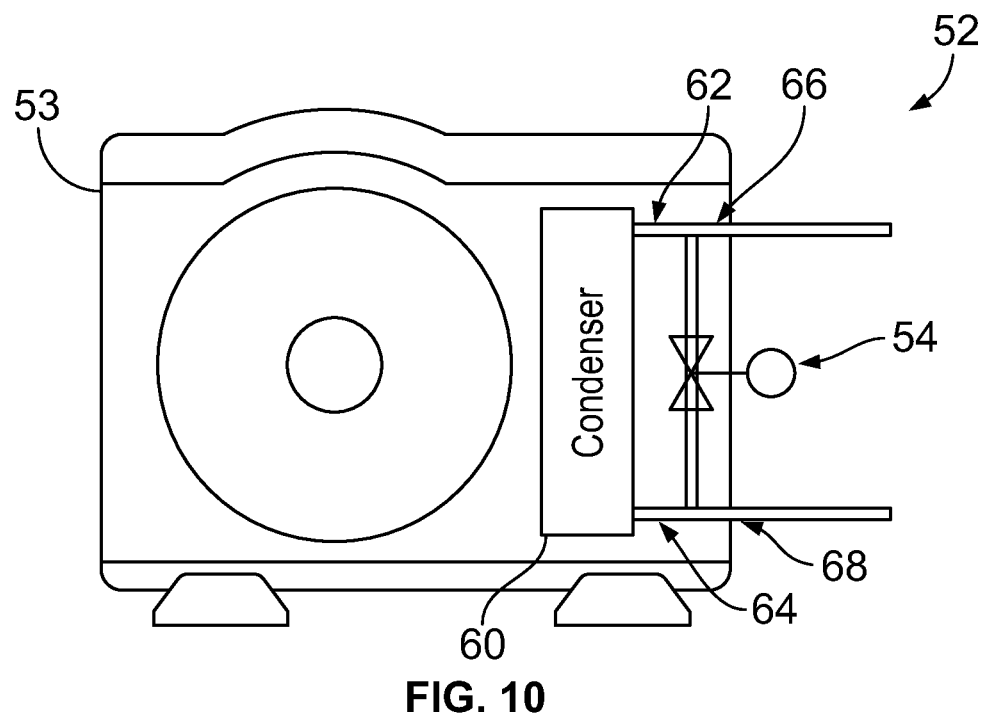
FIG. 10 is a schematic view of a connected heater for use in the connected pool system of FIG. 9 according to disclosed embodiments.

As seen in FIGS. 9 and 10, the heater 52 can include a housing 53 in which a heater bypass 58, a condenser 60, a heater control board 56, and a valve 54 are provided. The heater 52 includes a first inflow port 62 and a first outflow port 64 from the condenser 60 that are designed to accommodate incoming and outgoing water, respectively, through the condenser 60. Plumbing is provided to facilitate fluid communication between the various components of the heater 52 as would be understood by those having ordinary skill in the art. The heater bypass 58 can be coupled between the first inflow port 62 and the first outflow port 64 and can include a second inflow port 66 and a second outflow port 68. In some embodiments, the second inflow port 66 can be coupled to the first inflow port 62 and the second outflow port 68 can be coupled to the first outflow port 64 inside the housing 53 as seen in FIG. 10. However, in some embodiments, the valve 54 and/or the heater bypass 58 can be provided outside of the housing 53.

Similar to the heating system 22 described herein, in operation, the controller (e.g. the heater control board 56, the central controller 24, and/or the portable user device 26), can monitor one or more conditions relating to the heater 52. The valve 54 can be configured to control flow of water received from a pool into the first inflow port 62 and the heater bypass 58 based on operating state identified by the controller, and the heater 52 can be configured to heat portions of the water from the pool that flow between the first inflow port 62 and the first outflow port 64 when a heating mode is active. Furthermore, in response to identifying the operating state, the controller can be configured to transmit control signals that direct actuation of the valve 54 to achieve the operating state. In some embodiments, the controller can be electrically coupled to a plurality of sensors 55 (see FIG. 12) that relay the one or more conditions relating to the heater 52 to the controller.

Referring now to FIG. 10, in some embodiments, the valve 54, can be provided as a 2 way valve with various open and closed positions, as described hereinbelow. The valve 54 can be coupled between the second inflow port 66 and the second outflow port 68 and, in embodiments where the controller comprises the heater control board 56, can be electrically connected to the heater control board 56 to receive control commands therefrom to change a position of the valve 54. In some embodiments, the operating state for the valve 54 can include a timed sequence of actuations of the valve 54 between a closed state and an opened state, wherein, in the closed state, the valve blocks flow of the water from the pool between the second inflow port 66 and the second outflow port 68, and wherein, in the open state, the valve attenuates flow of the water from the pool into the first inflow port 62 by directing the water received from the pool to flow into both and the first inflow port 62 and the second inflow port 66.

Figure 11:
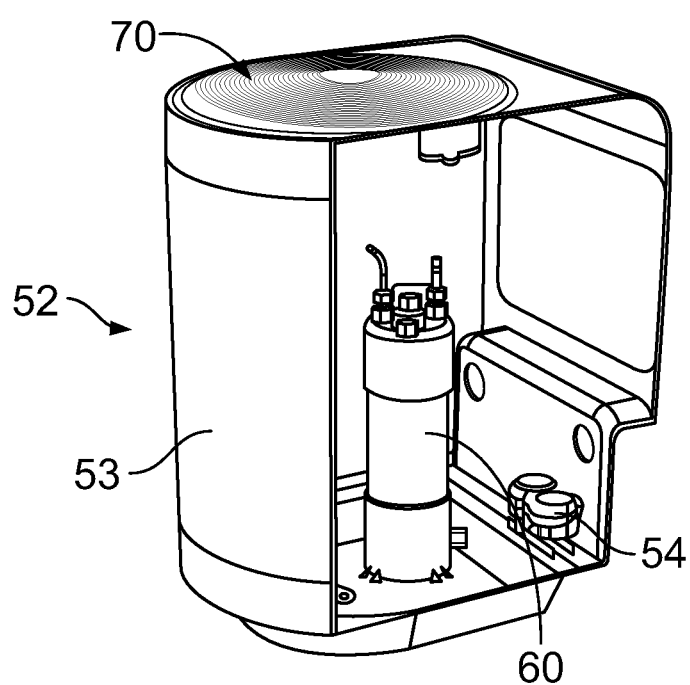
FIG. 11 is a schematic cross-sectional view of various internal components of the connected heater of FIG. 10 according to disclosed embodiments.
Figure 12:
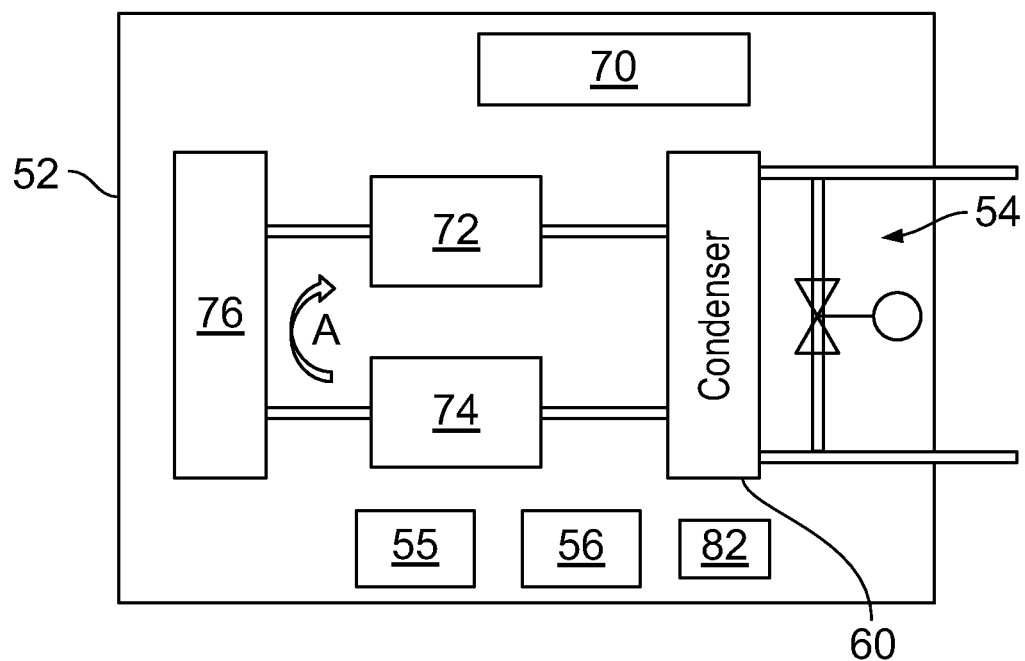
FIG. 12 is a schematic view of the connected heater of FIG. 10 according to disclosed embodiments.

In some embodiments, the heater 52 can include a heat pump. FIG. 11 is a partial cross-sectional view and FIG. 12 is a schematic view of various internal components of a heat pump embodiment of the heater 52 according to disclosed embodiments. As seen in FIGS. 11 and 12, in these embodiments, the heater 52 can include the heater control board 56, an expansion valve 74, a compressor 72, the condenser 60 coupled between the expansion valve 74 and the compressor 72, an evaporator 76 coupled between the expansion valve 74 and the compressor 72, a fan 70 that removes cool air from the heater and directs outside air onto the evaporator 76, and a thermal fluid configured to circulate through the expansion valve 74, the compressor 72, the condenser 60, and the evaporator 76 in a path indicate by arrow A.

The condenser 60 is in contact with the water flowing between the first inflow port 62 and the first outflow port 64 to transfer heat between the circulating thermal fluid and the water. Furthermore, the heater control board 56 can be configured to activate the fan 70, the expansion valve 74, and the compressor 72 to circulate the thermal fluid to engage the heating mode. During such circulation, the thermal fluid is initially heated by the outside air that collects on the evaporator 76, is further heated via compression by the compressor 72, and sheds heat to the water flowing between the first inflow port 62 and the first outflow port 64 at the condenser 60. In some embodiments, the thermal fluid is heated from a liquid state into a gaseous state before entering the compressor 72 and cooled back into the liquid state when shedding heat to the water flowing between the first inflow port 62 and the first outflow port 64. Various embodiments for the thermal fluid are contemplated such as refrigerant fluids like R22, R32, R407, R410, and other similar fluids known in the art.

In some embodiments, the controller, including but not limited to the heater control board 56, can engage the heating mode based on a temperature of the water flowing between the first inflow port 62 and the first outflow port 64. In these embodiments, one of the plurality of sensors 55 can include a water temperature sensor (e.g. a thermistor) configured to measure and relay to the controller a temperature of the water flowing between the first inflow port 62 and the first outflow port 64. In these embodiments, when the controller determines that the temperature of the water is below a first preconfigured threshold, the heater control board 56 can engage the heating mode. Furthermore, when the controller determines that the temperature of the water is above a second preconfigured threshold, the heater control board 56 can disengage the heating mode. In some embodiments, the first preconfigured threshold can be the same as the second preconfigured threshold. However, in some embodiments the first preconfigured threshold can be lower than the second preconfigured threshold.

In some embodiments, the controller, including but not limited to the heater control board 56, can control actuation of the valve 54 to mediate flow of water through the condenser 60 such that a COP of the heater 52 is maximized. In these embodiments, the controller parses the one or more conditions relating to the heater 52 to determine a current COP of the heater 52. When the current COP is less than a maximum COP, the controller identifies the operating state for the valve 54 as one where the valve 54 controls the flow of the water received from the pool into the first inflow port 62 and the heater bypass 58 to change the current COP to the maximum COP. For example, in embodiments where the valve 54 is the two-way valve that controls the flow rate through the condenser 60 via the timed sequence of actuations between the open and the closed states, the operating state of the valve 54 identified by the controller can include new timed sequence of actuations (e.g. holding the valve 54 open or closed for a longer or shorter time) of the valve 54 between the closed state and the opened state so as adjust the current COP of the heater 52 to the maximum COP. In some embodiments the controller can dynamically adjust the timing of the opening and closing of the valve 54 to achieve the maximum COP for the heater 52. For example, the controller can continue to adjust the timing of the opening and closing of the valve 54 until the controller determines that the COP for the heater 52 is at the maximum as indicated by the one or more conditions of the heater 52. In some embodiments, the controller can be configured to wait a preconfigured time after changing the timing of the opening and closing of the valve 54 before continuing to monitor the one or more conditions of the heater 52 and adjusting the timing so as to achieve the maximum COP. Waiting the preconfigured time can enable the one or more conditions of the heater 52 to balance or stabilize in response to the changed timing.

Various embodiments for the monitoring and calculating the current COP of the heater 52 are contemplated. For example, in some embodiments, the one or more conditions monitored by the controller can include at least one of temperature of the water at the first inflow port 62, temperature of the water at the first outflow port 64, a condensing temperature, and pressure of the thermal fluid at an outlet of the compressor 72. Additionally, in some embodiments, the one or more conditions monitored by the controller can include environmental conditions, external temperature, seasonal information, geographic information, and/or a flow rate of water through the pool or spa system 20 as directed by some of the one or more additional components. For example, in some embodiments, the one or more additional components can include one or more variable speed pumps that alter the flow rate of the water to enable low speed filtering and a high speed skimming period where debris is evacuated on the surface of the pool. Additionally, the flow rate of the water can change based on clogging of a filter and execution of a backwash cycle to unclog the filter. In some embodiments, a preferred flow rate in the condenser 60 to achieve a maximum COP for the heater 52 is approximately 4 to 6 m3/h when the flow rate in the connected pool or spa system 20 is approximately 10 to 18 m3/h.

In some embodiments, each of the plurality of sensors 55 can correspond to one or more of the one or more conditions monitored by the controller. For example, the plurality of sensors 55 can include various temperature sensors positioned throughout the connected pool or spa system 20 including, for example, at the first inflow port 62 and the first outflow port 64, various pressure sensors, various flow rate monitors, and other sensors as would be understood by those in the art.

Figure 13:
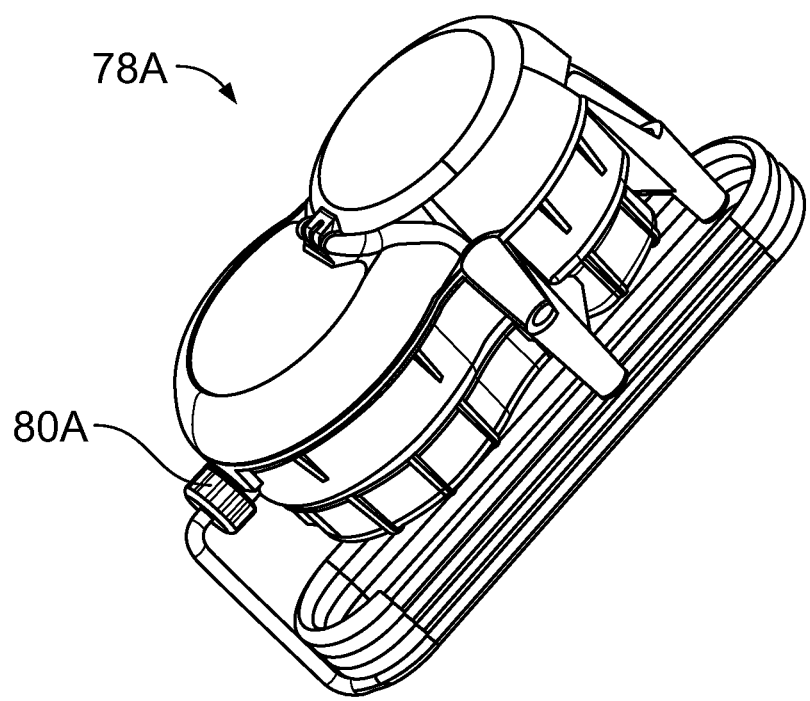
FIG. 13 is an isometric view of an actuator for a valve for use in the connected heater of FIGS. 10-12 according to disclosed embodiments.

FIG. 13 is an isometric view of actuator 78A for the valve 54. As seen in FIG. 13, the actuator 78A can include a power and data connector 80A that electrically couples the actuator 78A to the controller and or a valve control board 82 (see FIG. 12). The actuator 78A can be configured to receive control signals from the controller via the power and data connector 80A and responsive thereto actuate the valve 54 into the operating states as described herein. In some embodiments the actuator 78A can include the valve actuator for the Intellivalve™ provided by Pentair Water Pool & Spa (Cary, NC). In some embodiments, the actuator 78A can include approximately 24 defined positions into which the valve 54 can be actuated. Furthermore, in some embodiments, the power and data connector 80A can include a RS485 Modbus.

Figure 14:
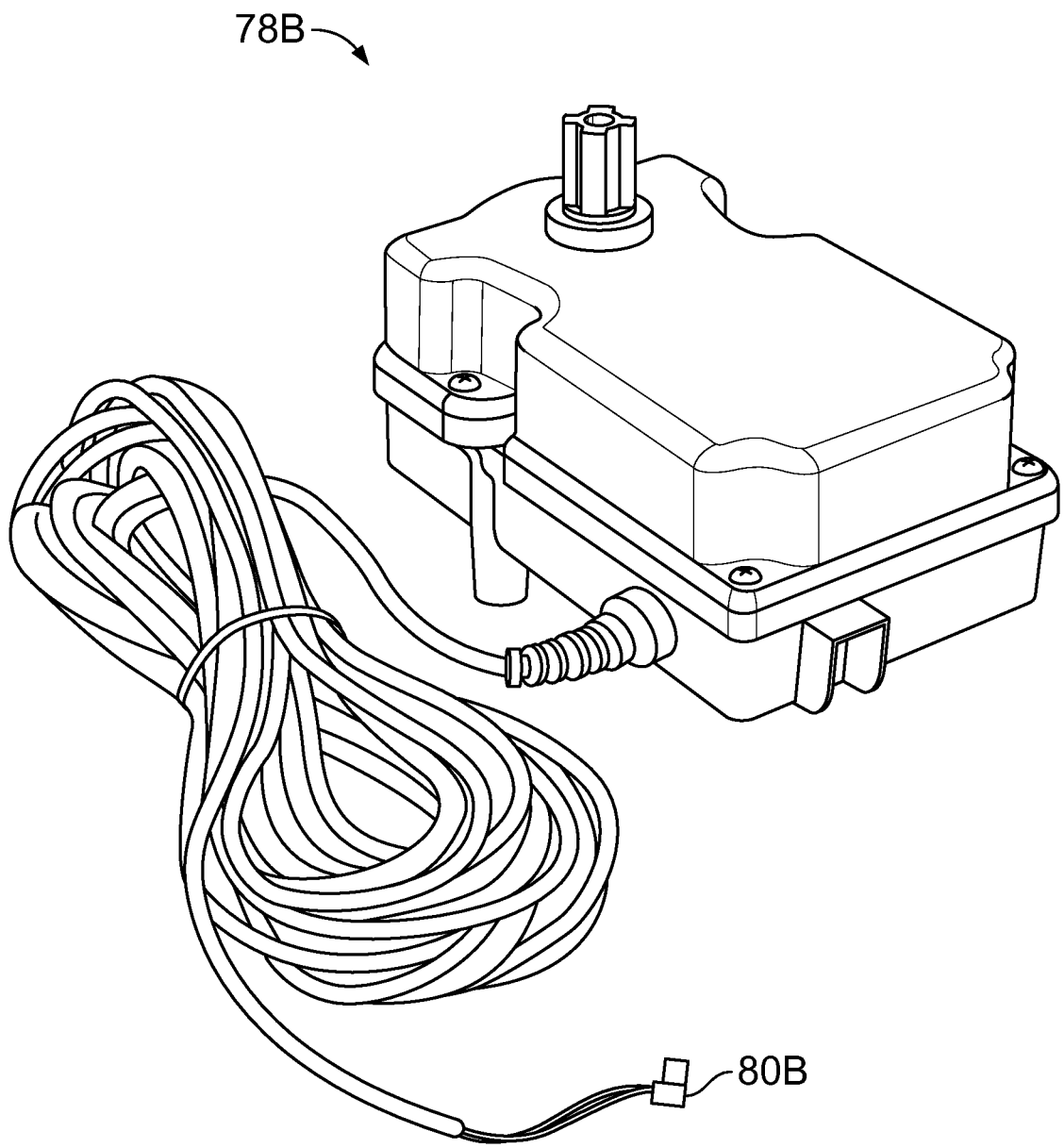
FIG. 14 is an isometric view of an alternative actuator for a valve for use in the connected heater of FIGS. 10-12 according to disclosed embodiments.

FIG. 14 is an isometric view of another actuator 78B for the valve 54 according to disclosed embodiments. Similar to the actuator 78A, the actuator 78B can include a power and data connector 80B that electrically couples the actuator 78B to the controller and or the valve control board 82 (see FIG. 12). The actuator 78B can be configured to receive control signals from the controller via the power and data connector 80B and responsive thereto actuate the valve 54 into the operating states as described herein. In some embodiments, control of the valve 54 can be accomplished by controlling a supply time of electric power to actuator 78B.

In some embodiments, the valve 54 or the actuator 78A or 78B can be supplied as a retrofit kit for the heater 52. Further still, in some embodiments valve control board 82 can be embedded in the actuator 78A or 78B or housed externally and electrically coupled thereto as shown in FIG. 12. In some embodiments, the valve control board 82, either separately or in conjunction with the heater control board 56, the central controller 24, and/or the portable user device 26, can comprise the controller as described herein.

Figure 15:
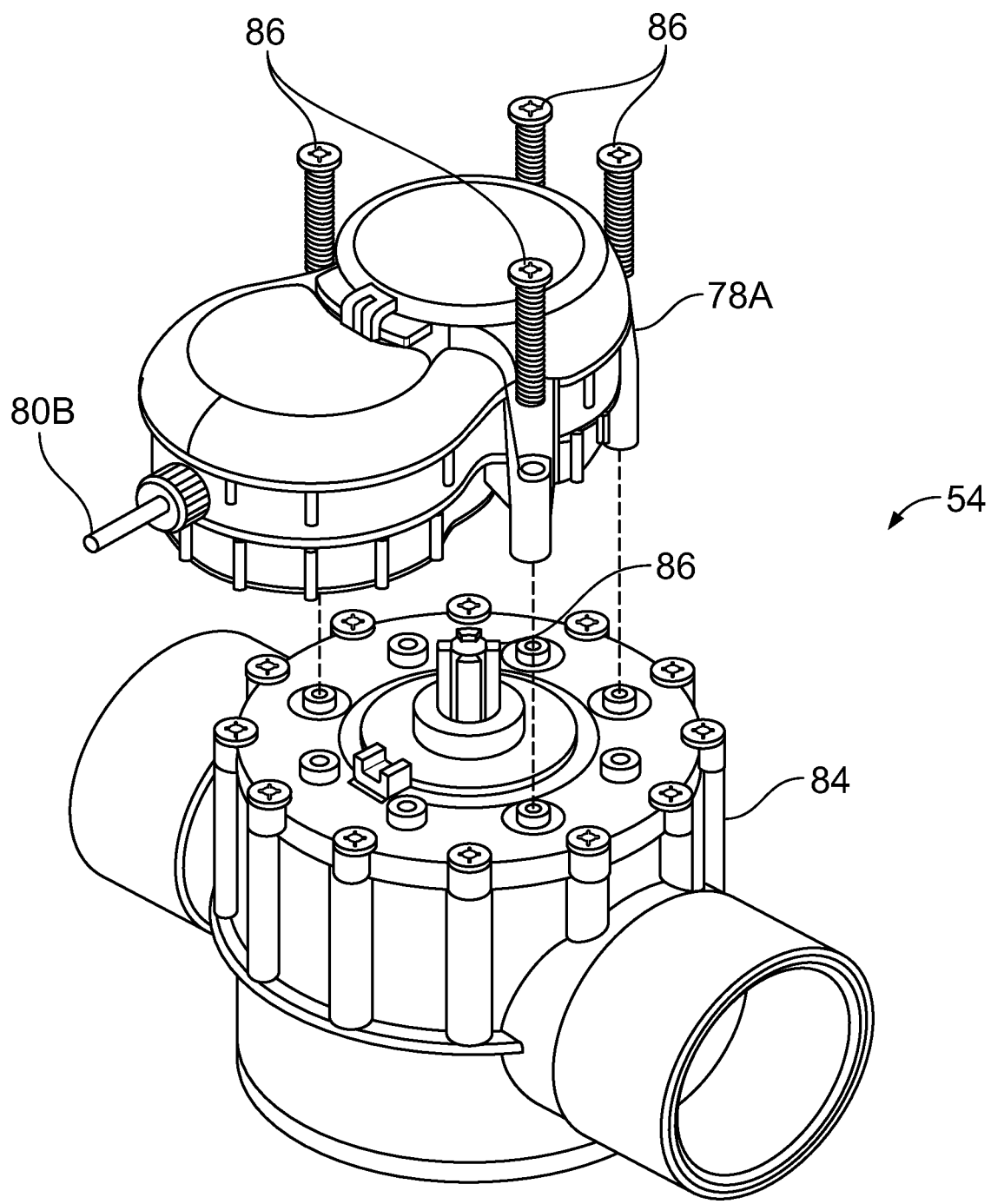
FIG. 15 is an isometric view of the actuator of FIG. 13 interfacing with the valve of the connected heater of FIGS. 10-12 according to disclosed embodiments.
Figure 16:
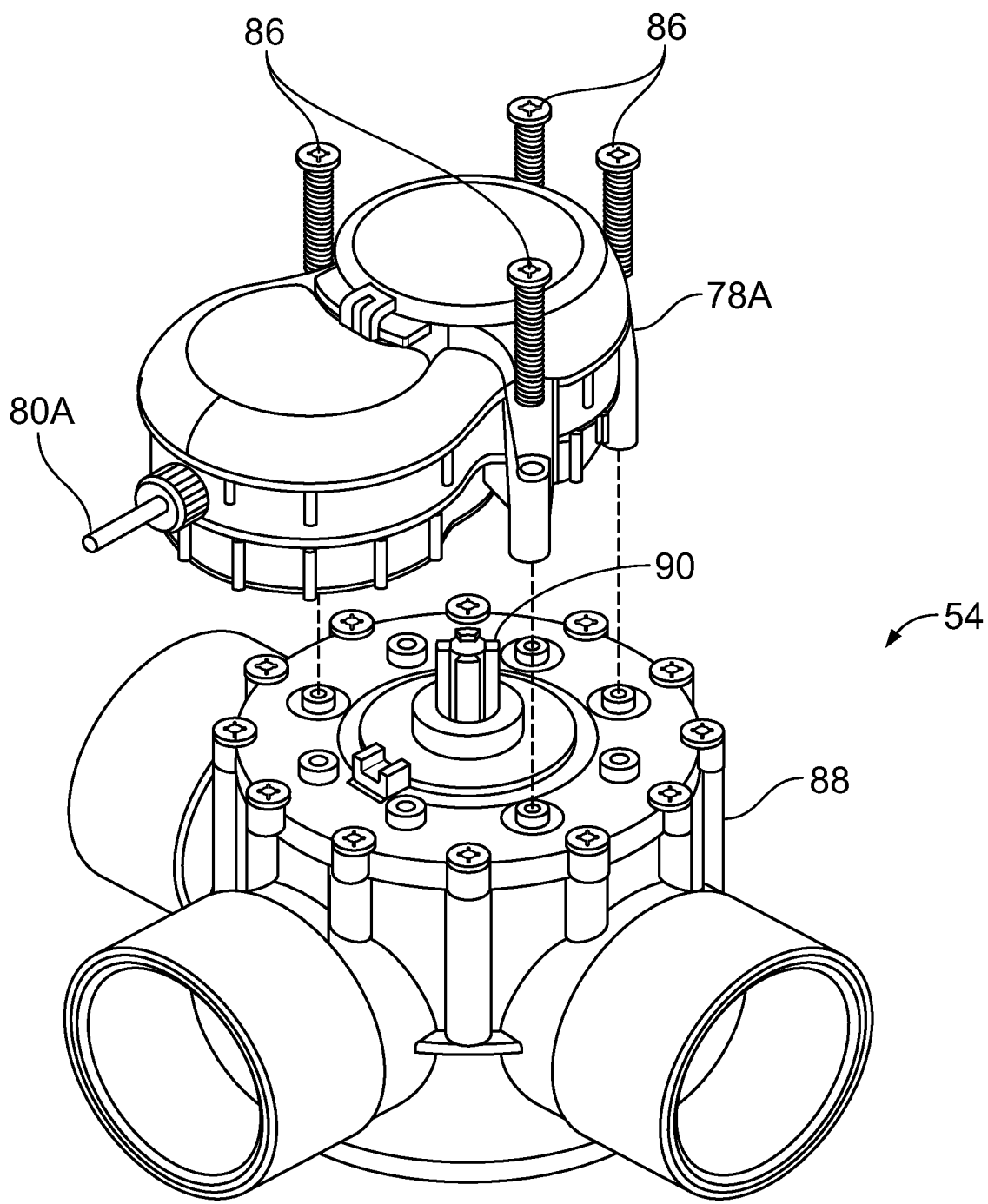
FIG. 16 is an isometric view of the actuator of FIG. 13 interfacing with another valve of the connected heater of FIGS. 10-12 according to disclosed embodiments.

Various embodiments for interfacing the actuators 78A and 78B with the valve 54 are contemplated. For example, as seen in FIG. 15, in embodiments where the valve 54 includes a two-way valve 84, the actuator 78A can be secured to the valve 54 by fasteners 86 such that it interfaces with a two-way spline 86 of the valve 54 that is maneuvered by the actuator 78A to position the valve 54 in the operating sates as described herein. Similarly, as seen in FIG. 16, in embodiments where the valve 54 includes a three-way valve 88, the actuator 78A can be secured to the valve 54 by fasteners 86 such that it interfaces with a three-way spline 90 of the valve 54 that is maneuvered by the actuator 78A to position the valve 54 in the operating sates as described herein. It will be appreciated, that similar interfacing operations as described and shown for the actuator 78A are contemplated with respect to the actuator 78B. Furthermore, it should also be appreciated that the actuators 78A and 78B, the two-way valve 84, and the three-way valve 88 shown in FIGS. 13-16 can be used in relation to the connected heating system 22 and the valve 34 as shown in FIGS. 1-3.

In some embodiments, the heater control board 56 and/or the valve control board 82 can be coupled to various sensors and switches that monitor for and/or activate at the presence of different potential error or fault conditions for the heater 52 and can include a data connection for coupling the valve control board 82 to the valve 54. In some embodiments, the valve control board 82 can be connected to the central controller 24 using an RS485 connection such as described here or the like and can communicate control signals, outputs from the various sensors and switches, and other relevant data using a customized protocol as described herein. In some embodiments, the valve control board 82 can be configured only to transmit in response to a command from the central controller 24. In some embodiments, the valve control board 82 can ensure data integrity prior to use of the data, by using one or more of a proper address, a proper opcode, a proper packet length, and a proper checksum when compiling and transmitting data to the central controller 24.

It is to be understood that the controller (e.g., the heater control boards 32 and 52, the central controller 24, and/or the portable user device 26) and other connected devices and sensors as disclosed herein can include respective transceiver and memory devices, each of which can be in communication with control circuitry, one or more programmable processors, and executable control software as would be understood by one of ordinary skill in the art. In some embodiments, the control software can be stored on a transitory or non-transitory computer readable medium, including, but not limited to local computer memory, RAM, optical storage media, magnetic storage media, flash memory, and the like, and some or all of the control circuitry, the programmable processors, and the control software can execute and control at least some of the methods described herein.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. A connected heating system for an aquatic application, comprising:
    a heater having a first inflow port and a first outflow port;
    a controller that monitors one or more conditions relating to the heater;
    a heater bypass coupled between the first inflow port and the first outflow port; and
    a valve that controls flow of water received from the aquatic application into the first inflow port and the heater bypass based on an operating state identified by the controller,
    wherein, responsive to the controller identifying the operating state, the controller is configured to transmit control signals that direct actuation of the valve to achieve the operating state, and
    wherein the heater is configured to heat portions of the water from the aquatic application that flow between the first inflow port and the first outflow port when a heating mode is active.

2. The connected heating system of claim 1, wherein the heater bypass includes a second inflow port coupled to the first inflow port of the heater and a second outflow port coupled to the first outflow port of the heater, wherein the valve is coupled between the second inflow port and the second outflow port and wherein the operating state includes a timed sequence of actuations of the valve between a closed state and an open state, and in the closed state, the valve blocks flow of the water from the aquatic application between the second inflow port and the second outflow port, and in the open state, the valve attenuates flow of the water from the pool into the first inflow port by directing the water received from the aquatic application to flow into both and the first inflow port of the heater and the second inflow port of the heater bypass.

3. The connected heating system of claim 1, wherein the operating state includes one of a plurality of actuation states of the valve, the plurality of actuation states of the value including a fully closed state, a fully open state, and one or more intermediate states, wherein, in the fully closed state, the valve directs the water received from the aquatic application to flow into the heater bypass by blocking flow into the first inflow port, wherein, in the fully open state, the valve enables water to flow freely into the first inflow port by blocking flow into the heater bypass, and wherein, in the one or more intermediate states, the valve attenuates flow of the water from the aquatic application into the first inflow port by directing the water received from the aquatic application to flow into both the heater bypass and the first inflow port.

4. The connected heating system of claim 1, wherein the heater includes a gas heater comprising a heater control board, an ignition control module electrically connected to the heater control board, a burner, and a blower motor, wherein the heater control board is configured to activate the blower motor and direct the ignition control module to ignite the burner to engage the heating mode.

5. The connected heating system of claim 4 further comprising a water temperature sensor electrically coupled to the controller, wherein the one or more conditions relating to the heater include a temperature of the water flowing between the first inflow port and the first outflow port as relayed to the controller by the temperature sensor,
    wherein, when the controller determines that the temperature of the water is below a first preconfigured threshold, the heater control board engages the heating mode and the controller identifies the operating state as a fully open state where the valve enables the water from the aquatic application to flow freely into the first inflow port by blocking flow into the heater bypass, and
    wherein when the controller determines that the temperature of the water is above a second preconfigured threshold the heater control board disengages the heating mode and the controller identifies the operating state as an intermediate state where the valve attenuates flow of the water from the aquatic application into the first inflow port by directing the water received from the aquatic application to flow into both the heater bypass and the first inflow port.

6. The connected heating system of claim 5, wherein the heater control board comprises the controller.

7. The connected heating system of claim 5, wherein the controller is electrically connected to the heater control board via a wireless medium.

8. The connected heating system of claim 5, wherein the controller is electrically connected to the heater control board via an RS485 connection that includes a half-duplex 485 link that operates in a listen only mode such that the heater control board is configured to transmit only when sending of data to the controller is required.

9. The connected heating system of claim 1 further comprising an actuator connected to the valve and electrically coupled to the controller, wherein the actuator is configured to actuate the valve into the operating state in response to receiving the control signals from the controller.

10. The connected heating system of claim 1, wherein the valve includes a T configuration where one opening of the valve is coupled to the first inflow port by a pipe or conduit that is substantially parallel to ground and another opening of the valve is coupled to the heater bypass, wherein the heater bypass is substantially perpendicular to the ground, and
wherein, a check valve is positioned between the first outflow port and a second outflow port of the heater bypass to prevent heated water from flowing back into the heater.

11. The connected heating system of claim 1 wherein the valve includes a T configuration where one opening of the valve is coupled to the first inflow port by a pipe or conduit that is substantially parallel to ground and another opening of the valve is coupled to the heater bypass, wherein the heater bypass is substantially perpendicular to the ground, and
wherein, a check valve is positioned between the first outflow port and a second outflow port of the heater bypass to prevent heated water from flowing back into the heater.

12. A connected heating system for a swimming pool, comprising
a heater having a housing, a first inflow port in fluid communication with the housing, a first outflow port in fluid communication, a heater control board disposed inside the housing, an ignition control module electrically connected to the heater control board and disposed inside the housing, a burner disposed inside the housing, and a blower motor disposed inside the housing;
a controller that monitors a temperature of water flowing between the inflow port and the outflow port of the heater;
a heater bypass coupled between the first inflow port and the first outflow port; and
a valve that controls flow of water received from a pool into the first inflow port and the heater bypass based on an operating state identified by the controller,
wherein, responsive to the controller identifying the operating state, the controller is configured to transmit control signals that direct actuation of the valve to achieve the operating state, and wherein the heater is configured to engage a heating mode to heat portions of the water from the pool that flow between the first inflow port and the first outflow port by activating the blower motor and directing the ignition control module to ignite the burner.

13. The connected heating system of claim 12, wherein the operating state includes one of a plurality of actuation states of the valve, the plurality of actuation states of the valve including a fully closed state, a fully open state, and one or more intermediate states, wherein, in the fully closed state, the valve directs the water received from the pool to flow into the heater bypass by blocking flow into the first inflow port, wherein, in the fully open state, the valve enables water to flow freely into the first inflow port by blocking flow into the heater bypass, and wherein, in the one or more intermediate states, the valve attenuates flow of the water from the pool into the first inflow port by directing the water received from the pool to flow into both the heater bypass and the first inflow port.

14. The connected heating system of claim 12 further comprising a water temperature sensor electrically coupled to the controller, wherein the water temperature sensor measures and relays to the controller a temperature of the water flowing between the first inflow port and the first outflow port,
wherein, when the controller determines that the temperature of the water is below a first preconfigured threshold, the heater control board engages the heating mode and the controller identifies the operating state as a fully open state where the valve enables the water from the pool to flow freely into the first inflow port by blocking flow into the heater bypass,
wherein when the controller determines that the temperature of the water is above a second preconfigured threshold the heater control board disengages the heating mode and the controller identifies the operating state as an intermediate state where the valve attenuates flow of the water from the pool into the first inflow port by directing the water received from the pool to flow into both the heater bypass and the first inflow port.

15. The connected heating system of claim 12, wherein the heater control board comprises the controller.

16. The connected heating system of claim 12, wherein the controller is electrically connected to the heater control board via a wireless medium.

17. The connected heating system of claim 12, wherein the controller is electrically connected to the heater control board via an RS485 connection that includes a half-duplex 485 link that operates in a listen only mode such that the heater control board is configured to transmit only when sending of data to the controller is required.

18. A method of operating a heater, comprising:
monitoring a temperature of water flowing between an inflow port and an outflow port of the heater via a controller and a sensor in communication with the controller;
engaging a heating mode of the heater to heat the water flowing between the inflow port and the outflow port via a heater control board of the heater when the controller determines that the temperature of the water is below a first preconfigured temperature threshold;
sending a first control signal to actuate a valve into a fully open state where the valve enables the water to flow freely into the first-inflow port by blocking flow into a heater bypass when the heating mode is engaged;
disengaging the heating mode of the heater when the controller determines that the temperature of the water is above a second preconfigured temperature threshold; and
sending a second control signal to actuate the valve into an intermediate state where the valve attenuates flow of the water into the inflow port by directing the water to flow into both the heater bypass and the first inflow port when the heating mode is disengaged.

19. The method of claim 18, wherein the first preconfigured temperature is the same as the second preconfigured temperature.

20. The method of claim 18, wherein the controller is electrically connected to the heater control board via an RS485 connection that includes a half-duplex 485 link that operates in a listen only mode such that the heater control board is configured to transmit only when sending of data to the controller is required.

* * * * *